US011451285B2

(12) United States Patent
Feng et al.

(10) Patent No.: US 11,451,285 B2
(45) Date of Patent: Sep. 20, 2022

(54) EFFICIENT EXTREME HIGH-THROUGHPUT SOUNDING FEEDBACK SUPPORTING JMAP AND CMAP TRANSMISSIONS

(71) Applicant: MediaTek Singapore Pte. Ltd., Singapore (SG)

(72) Inventors: Shuling Feng, San Jose, CA (US); Jianhan Liu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/074,432

(22) Filed: Oct. 19, 2020

(65) Prior Publication Data
US 2021/0126686 A1 Apr. 29, 2021

Related U.S. Application Data

(60) Provisional application No. 62/927,174, filed on Oct. 29, 2019, provisional application No. 63/036,521, filed on Jun. 9, 2020.

(51) Int. Cl.
*H04B 7/024* (2017.01)
*H04B 7/06* (2006.01)
*H04W 84/12* (2009.01)

(52) U.S. Cl.
CPC ............. *H04B 7/066* (2013.01); *H04B 7/024* (2013.01); *H04B 7/0626* (2013.01); *H04B 7/0689* (2013.01); *H04W 84/12* (2013.01)

(58) Field of Classification Search
CPC ...... H04W 84/12; H04W 88/08; H04B 7/024; H04B 7/0617; H04B 7/0626; H04B 7/026; H04B 7/061; H04B 7/0619; H04B 7/0684; H04B 7/0689; H04B 7/066896
See application file for complete search history.

(56) References Cited

U.S. PATENT DOCUMENTS

| 2015/0009966 | A1 | 1/2015 | Lee et al. |
| 2018/0234135 | A1 | 8/2018 | Vermani et al. |
| 2019/0028168 | A1 | 1/2019 | Vermani et al. |
| 2019/0045366 | A1 | 2/2019 | Vermani et al. |
| 2021/0044333 | A1* | 2/2021 | Jiang ............... H04B 7/0619 |

FOREIGN PATENT DOCUMENTS

| CN | 106102173 A | 11/2016 |
| EP | 2840857 B1 | 9/2017 |
| KR | 1020190116308 A | 10/2019 |
| WO | WO 2019023173 A1 | 1/2019 |

OTHER PUBLICATIONS

European Patent Office, European Search Report for European Patent Application No. 20204391.5, dated Mar. 16, 2021.
Taiwan Intellectual Property Office, Office Action for Taiwan Patent Application No. 109137415, dated Sep. 10, 2021.

* cited by examiner

*Primary Examiner* — Rahel Guarino
(74) *Attorney, Agent, or Firm* — Han IP PLLC; Andy M. Han

(57) ABSTRACT

An apparatus implemented in an access point (AP) participates in joint soundings together with one or more other APs in a joint multi-AP (JMAP) configuration to receive joint feedbacks from a plurality of stations (STAs) responding to the joint soundings. The apparatus then performs transmissions in a coordinated multi-AP (CMAP) configuration with the one or more other APs or in a single-AP configuration with no other AP based on the joint feedbacks received while in the JMAP configuration.

18 Claims, 11 Drawing Sheets

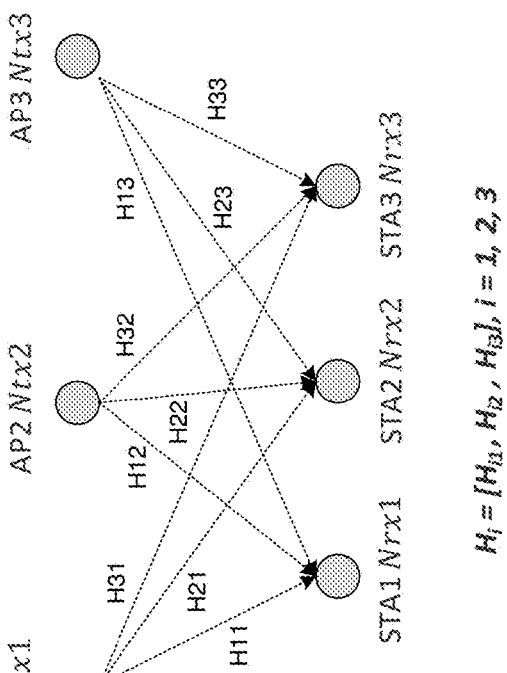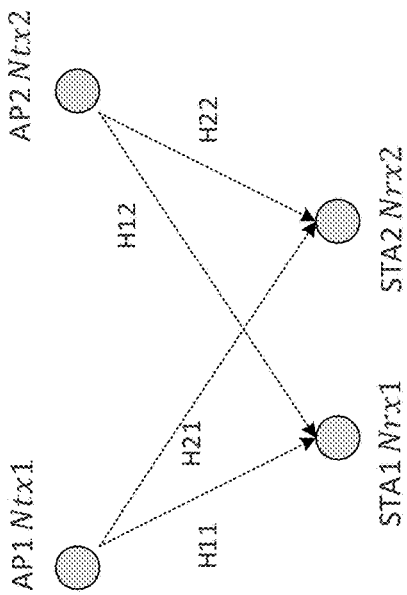
FIG. 2

| Feedback Items | Scheme A (Large V) | | Scheme B (Small V) | |
|---|---|---|---|---|
| | S Vector & V Matrix Size | # of Feedbacks | S Vector & V Matrix Size | # of Feedbacks |
| STA1 → AP1 SNR | $S_1$: 1 × 2 | SNR: 2 | $S_{11}$: 1 × 2<br>$S_{12}$: 1 × 2 | SNR: 4 |
| STA1 → AP1 V Matrix | $V_1$: 16 × 2 | Angle Set $(\Phi, \Psi)$: 29 | $V_{11}$: 8 × 2<br>$V_{12}$: 8 × 2 | Angle Set $(\Phi, \Psi)$: 26 |
| STA2 → AP2 SNR | $S_2$: 1 × 2 | SNR: 2 | $S_{21}$: 1 × 2<br>$S_{22}$: 1 × 2 | SNR: 4 |
| STA2 → AP2 V Matrix | $V_2$: 16 × 2 | Angle Set $(\Phi, \Psi)$: 29 | $V_{21}$: 8 × 2<br>$V_{22}$: 8 × 2 | Angle Set $(\Phi, \Psi)$: 26 |

| Feedback Items | Scheme A (Large V) | | Scheme B (Small V) | |
|---|---|---|---|---|
| | S Vector & V Matrix Size | # of Feedbacks | S Vector & V Matrix Size | # of Feedbacks |
| STA1 → AP1 Singular Values | $S_1$: 1 x 2 | SNR: 2 | $S_{11}$: 1 x 2<br>$S_{12}$: 1 x 2 | SNR: 4 |
| STA1 → AP1 V Matrix | $V_1$: 16 x 2 | Angles: 58 | $V_{11}$: 8 x 2<br>$V_{12}$: 8 x 2 | Angles: 52 |
| STA2 → AP2 Singular Values | $S_2$: 1 x 2 | SNR: 2 | $S_{21}$: 1 x 2<br>$S_{22}$: 1 x 2 | SNR: 4 |
| STA2 → AP2 V Matrix | $V_2$: 16 x 2 | Angles: 58 | $V_{21}$: 8 x 2<br>$V_{22}$: 8 x 2 | Angles: 52 |

| | Sounding | Feedback | Feedback CSI | Original Coding | Reconfiguration |
|---|---|---|---|---|---|
| Method 1 | Joint | Joint | $diag(S_j(1:N_{rxi}, 1:N_{rxi}))$<br>Uncompressed: $V_j(1:N_{total\_tx}, 1:N_{rxi})$<br>Compressed: $V_{cj}(1:N_{total\_tx}, 1:N_{rxi})$ | JMAP | Reduced JMAP / CMAP / Single AP |
| | | Sequential<br>(* Note: Extra feedback info is needed to re-configure CMAP to JMAP but not needed to re-configure CMAP to Single AP operation) | Uncompressed V:<br>$diag(S_{ij}(1:N_{rxi}, 1:N_{rxi}))$<br>$V_{ij}(1:N_{total\_tx}, 1:N_{rxi})$<br>$eU_{ij}$ for $j>1$<br><br>Compressed V – Scheme A:<br>$diag(S_{ij}(1:N_{rxi}, 1:N_{rxi}))$<br>$ePh\_V_{ij}, j=1, 2, ..., N_{ap}$<br>$V_{cij}(1:N_{total\_tx}, 1:N_{rxi})$<br>$eU_{ij}$ for $j>1$<br><br>Compressed V – Scheme B:<br>$diag(S_{ij}(1:N_{rxi}, 1:N_{rxi}))$<br>$ePh\_V_{i1}$<br>$V_{cij}(1:N_{total\_tx}, 1:N_{rxi})$<br>$eU_{ij}$ for $j>1$ | | |
| Method 2 | Sequential / Joint | | | CMAP | JMAP / Single AP |
| Method 3 | Sequential | Joint | $diag(S_j(1:N_{rxi}, 1:N_{rxi}))$<br>Uncompressed: $V_j(1:N_{total\_tx}, 1:N_{rxi})$<br>Compressed: $V_{cj}(1:N_{total\_tx}, 1:N_{rxi})$ | CMAP | JMAP / Single AP |

PARTICIPATE IN JOINT SOUNDINGS TOGETHER WITH ONE OR MORE OTHER ACCESS POINTS (APs) IN A JOINT MULTI-AP (JMAP) CONFIGURATION TO RECEIVE JOINT FEEDBACKS FROM A PLURALITY OF STATIONS (STAs) RESPONDING TO THE JOINT SOUNDINGS
910

PERFORM TRANSMISSIONS IN A COORDINATED MULTI-AP (CMAP) CONFIGURATION WITH THE ONE OR MORE OTHER APs OR IN A SINGLE-AP CONFIGURATION WITH NO OTHER AP BASED ON THE JOINT FEEDBACKS RECEIVED WHILE IN THE JMAP CONFIGURATION
920

FIG. 9

1000 

PARTICIPATE IN SEQUENTIAL OR JOINT SOUNDINGS TOGETHER WITH ONE OR MORE OTHER ACCESS POINTS (APs) IN A COORDINATED MULTI-AP (CMAP) CONFIGURATION TO RECEIVE FEEDBACKS FROM A PLURALITY OF STATIONS (STAs) RESPONDING TO THE SEQUENTIAL OR JOINT SOUNDINGS
1010

PERFORM TRANSMISSIONS IN A JOINT MULTI-AP (JMAP) CONFIGURATION WITH THE ONE OR MORE OTHER APs OR IN A SINGLE-AP CONFIGURATION WITH NO OTHER AP BASED AT LEAST IN PART ON THE FEEDBACKS RECEIVED WHILE IN THE CMAP CONFIGURATION
1020

FIG. 10

EFFICIENT EXTREME HIGH-THROUGHPUT SOUNDING FEEDBACK SUPPORTING JMAP AND CMAP TRANSMISSIONS

CROSS REFERENCE TO RELATED PATENT APPLICATION

The present disclosure is part of a non-provisional patent application claiming the priority benefit of U.S. Provisional Patent Application Nos. 62/927,174 and 63/036,521, filed 29 Oct. 2019 and 9 Jun. 2020, respectively, the contents of which being incorporated by reference in their entirety.

TECHNICAL FIELD

The present disclosure is generally related to wireless communications and, more particularly, to efficient extreme high-throughput (EHT) sounding feedback for support of both joint multi-access point (JMAP) and coordinated multi-access point (CMAP) transmissions.

BACKGROUND

Unless otherwise indicated herein, approaches described in this section are not prior art to the claims listed below and are not admitted as prior art by inclusion in this section.

In wireless local area networks (WLANs), the use of multiple access points (APs) as multi-AP (MAP) systems, also known as "mesh WiFi" systems, to provide network access to stations (STAs) is becoming more prevalent for increased transmission throughput and enhanced network performance. In the next-generation WLANs in accordance with the Institute of Electrical and Electronics Engineers (IEEE) 802.11 standards for EHT wireless communications, joint feedbacks are needed (e.g., large V feedbacks) to support joint transmissions. For coordinated transmissions, such as coordinated beamforming for example, coordinated spatial reuse and coordinated orthogonal frequency-division multiple access (OFDMA) (e.g., single-user multiple-input-multiple-output (SU-MIMO)), separate feedbacks may be sufficient (e.g., small V feedbacks). For single-AP transmitter beamforming, including SU-MIMO and multi-user multiple-input-multiple-output (MU-MIMO), separate feedbacks may be sufficient (e.g., small V feedbacks). However, details of support for EHT sounding feedbacks for joint transmissions, coordinated transmissions and single-AP transmitter beamforming remain to be specified.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to efficient EHT sounding feedback for support of both JMAP and CMAP transmissions.

In one aspect, a method implemented in an AP may involve participating in joint soundings together with one or more other APs in a JMAP configuration to receive joint feedbacks from a plurality of STAs responding to the joint soundings. The method may also involve performing transmissions in a CMAP configuration with the one or more other APs or in a single-AP configuration with no other AP based on the joint feedbacks received while in the JMAP configuration.

In another aspect, a method implemented in an AP may involve participating in sequential or joint soundings together with one or more other APs in a CMAP configuration to receive feedbacks from a plurality of STAs responding to the sequential or joint soundings. The method may also involve performing transmissions in a JMAP configuration with the one or more other APs or in a single-AP configuration with no other AP based at least in part on the feedbacks received while in the CMAP configuration.

In still another aspect, a method may involve an apparatus implemented in an AP participating in joint soundings together with a first set of APs in a JMAP configuration to receive joint feedbacks from a plurality of STAs responding to the joint soundings. The method may also involve the apparatus performing transmissions in a reduced JMAP configuration with a second set of APs based on the joint feedbacks received while in the JMAP configuration with no additional feedback information. The first set of APs may have more APs than the second set of APs. The joint feedbacks received from the plurality of STAs may include joint channel state information (CSI) from the plurality of STAs.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example scenario in accordance with the present disclosure.

FIG. 5 is a diagram of an example scenario in accordance with the present disclosure.

FIG. 7 is a diagram of an example table in accordance with the present disclosure.

FIG. 9 is a flowchart of an example process in accordance with an implementation of the present disclosure.

FIG. 10 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to efficient EHT sounding feedback for support of both JMAP and CMAP transmissions. According to the present disclosure, a number of possible solutions may be implemented separately or jointly. That is, although these possible solutions may be described below separately, two or more of these possible solutions may be implemented in one combination or another.

Figure 1:
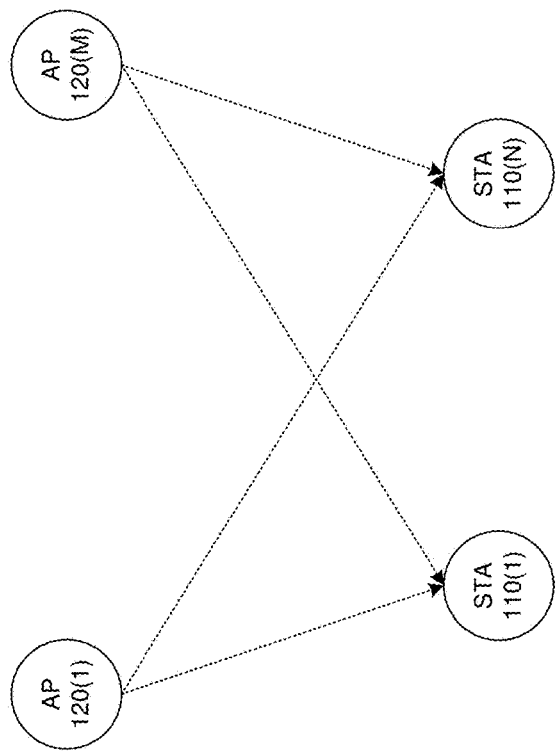
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 7 illustrate examples of implementation of various proposed schemes in network environment 100 in accordance with the present disclosure. The following description of various proposed schemes is provided with reference to FIG. 1-FIG. 7.

Referring to FIG. 1, network environment 100 may involve a plurality of stations (STAs) 110(1)~110(N) associated with, and in wireless communication with, access points (APs) 120(1)~120(M) in accordance with one or more IEEE 802.11 standards (e.g., IEEE 802.11ax, IEEE 802.11be and future-developed standards), with M and N being positive integer greater than 1. Under various proposed schemes in accordance with the present disclosure, STAs 110(1)~110(N) and APs 120(1) 120(M) may be configured to perform efficient EHT sounding feedback for support of both JMAP and CMAP transmissions in accordance with various proposed schemes described below.

In network environment 100, with respect to MAP joint sounding joint feedback, sounding from APs 120(1)~120(M) to STAs 110(1)~110(N) may be notated with parameters $N_{ap}$ (denoting the total number of coordinated APs), $N_{sta}$ (denoting the total number of STAs supported by $N_{ap}$ coordinated APs), (denoting the number of receives at the $i^{th}$ STA), and $N_{txi}$ (denoting the number of transmitters at the $i^{th}$ AP). Some example configurations may be as follows (in which STAT is associated with $AP_j$, and $STA_i$ feedbacks CSIs to $AP_j$):

2 APs→3 STAs: STA, is associated with and feedbacks CSI to $AP_1$, $STA_2$ is associated with and feedbacks CSI to $AP_2$, $STA_3$ is associated with and feedbacks CSI to $AP_2$ 3 APs→3 STAs: STAT is associated with and feedbacks CSI to $AP_i$, i=1, 2, 3

The APs may jointly sound $N_{total\_tx}$ spatial time streams, where $N_{total\_tx}=N_{tx1}+N_{tx2}+\ldots+N_{tx(Nap)}$. At the $i^{th}$ STA (e.g., $i^{th}$ user), channel response matrix $H_i[N_{rxi} \times N_{total\_tx}]$ is estimated for the $k^{th}$ subcarrier (SC). For simplicity, the index k of SC may be dropped from all notations. Then, full-dimension channel matrix H, may be constructed may be as $H_i=[H_{i1}, H_{i2}, \ldots, H_{i(Nap)}]$. Moreover, singular value decomposition (SVD) may be performed on $H_i$ as $[U_i, S_i, V_i]=SVD(H_i)$. Feedback singular values may be expressed as $diag(S_i (1:N_{rxi}, 1:N_{rxi}))$, and corresponding vectors may be expressed as $V_i (1:N_{total\_tx}, 1:N_{rxi})$. Additionally, compression methods may be used to compress $V_i (1:N_{total\_tx}, 1:N_{rxi})$ and feedback $V_{ci}$ vectors as $V_{ci}=V_i (1:N_{total\_tx}, 1:N_{rxi}) \cdot Rot\_V_i$, where $Rot\_V_i$ is a $N_{rxi} \times N_{rxi}$ diagonal matrix, with each diagonal element being a complex phasor to rotate a corresponding column of V, as $$Rot\_V_i = \begin{bmatrix} e^{j\theta_{i,1}} & 0 & 0 \\ 0 & \ddots & 0 \\ 0 & 0 & e^{j\theta_{i,Nrxi}} \end{bmatrix}$$

In network environment 100, with respect to MAP joint sounding sequential feedback, sounding from APs 120(1)~120(M) to STAs 110(1)~110(N) may be notated with parameters $N_{ap}$ (denoting the total number of coordinated APs), $N_{sta}$ (denoting the total number of STAs supported by $N_{ap}$ coordinated APs), $N_{rxi}$ (denoting the number of receives at the $i^{th}$ STA), and $N_{txi}$ (denoting the number of transmitters at the $i^{th}$ AP). Some example configurations may be as follows (in which STAT is associated with $AP_j$, and $STA_i$ feedbacks CSIs to $AP_j$):

2 APs→3 STAs: STA, is associated with and feedbacks CSI to $AP_1$, $STA_2$ is associated with and feedbacks CSI to $AP_2$, $STA_3$ is associated with and feedbacks CSI to $AP_2$ 3 APs→3 STAs: STAT is associated with and feedbacks CSI to $AP_i$, i=1, 2, 3

The APs may jointly sound $N_{total\_tx}$ spatial time streams, where $N_{total\_tx}=N_{tx1}+N_{tx2}+\ldots+N_{tx(Nap)}$. At the $i^{th}$ STA (e.g., $i^{th}$ user), channel response matrix $H_i [N_{rxi} \times N_{total\_tx}]$ is estimated for the $k^{th}$ SC. Regarding sequentially scheduled feedback of $H_{ij}$, =1, ..., $N_{sta}$ ($H_{ij}$ being extracted from H, with the columns corresponding to the $j^{th}$ AP), at the $i^{th}$ STA, SVD may be performed on $H_{ij}$ as $[U_{ij}, S_{ij}, V_{ij}]=SVD(H_{ij})$, j=1, ..., $N_{ap}$. Additionally, at the $i^{th}$ STA, singular values $diag(S_{ij} (1:N_{rxi}, 1:N_{rxi}))$ and vectors in $V_{ij}(1: N_{txj}, 1:N_{rxi})$ may be fed back to its associated $j^{th}$ AP. Moreover, compression methods may be used to feedback $V_{cij}$ vectors as $V_{cij}=V_{ij}(1:N_{txi}, 1:N_{rix}) \cdot Rot\_V_{ij}$, where $Rot\_V_{ij}$ is a $N_{rxi} \times N_{rxi}$ diagonal matrix, with each diagonal element being a complex phasor to rotate a corresponding column of $V_i$, as $$\text{Rot\_V}_{ij} = \begin{bmatrix} e^{j\theta_{ij,1}} & 0 & 0 \\ 0 & \ddots & 0 \\ 0 & 0 & e^{j\theta_{ij,Nrxi}} \end{bmatrix}$$

In network environment 100, with respect to MAP sequential sounding sequential feedback, sounding from APs 120(1)~120(M) to STAs 110(1)~110(N) may be notated with parameters $N_{ap}$ (denoting the total number of coordinated APs), $N_{sta}$ (denoting the total number of STAs supported by $N_{ap}$ coordinated APs: $N_{sta}=N_{sta1}+ \ldots + N_{stai}+ \ldots +N_{sta}(N_{ap})$), $N_{rxi}$ (denoting the number of receives at the $i^{th}$ STA), and $N_{txi}$ (denoting the number of transmitters at the $i^{th}$ AP), where the $i^{th}$ AP may support $N_{staj}$ STAs, indexing from i to I+$N_{staj}$−1. Some example configurations may be as follows (in which STAT is associated with $AP_j$, and $STA_i$ feedbacks CSIs to $AP_j$):

2 APs→3 STAs: $AP_1$ supports $STA_1$, $AP_2$ supports $STA_2$ and $STA_3$

3 APs 6→3 STAs: $AP_i$ supports $STA_i$, i=1, 2, 3

The APs may be scheduled to sound STAs sequentially. When the jth AP is sounding, channel response matrix $H_{ij}[N_{rxi} \times N_{txi}]$ is estimated at ith STA, i=1, $N_{sta}$. Regarding sequentially scheduled feedbacks of $H_{ij}$, i=1, . . . , $N_{sta}$, the following feedback information is herein referred to as basic sequential sounding feedback. At the $i^{th}$ STA, SVD may be performed on $H_{ij}$ as $[U_{ij}, S_{ij}, V_{ij}]=\text{SVD}(H_{ij})$, j=1, $N_{ap}$. Additionally, at the $i^{th}$ STA, singular values diag($S_{ij}$ (1:$N_{rxi}$, 1:$N_{rxi}$)) and vectors in $V_{ij}$(1: $N_{txj}$, 1:$N_{rxi}$) may be fed back to its associated $j^{th}$ AP. Moreover, compression methods may be used to feedback $V_{cij}$ vectors as $V_{cij}=V_{ij}(1:N_{txi}, 1:N_{rxi})\cdot\text{Rot\_V}_{ij}$, where $\text{Rot\_V}_{ij}$ is a $N_{rxi} \times N_{rxi}$ diagonal matrix, with each diagonal element being a complex phasor to rotate a corresponding column of $V_i$, as $$\text{Rot\_V}_{ij} = \begin{bmatrix} e^{j\theta_{ij,1}} & 0 & 0 \\ 0 & \ddots & 0 \\ 0 & 0 & e^{j\theta_{ij,Nrxi}} \end{bmatrix}$$

Furthermore, a phase vector may be also noted here:

$ePh\_V_{ij}=[\theta_{ij,1},\theta_{ij,2}, \ldots ,\theta_{ij,Nrxi}]$

In network environment 100, with respect to MAP sequential sounding joint feedback, sounding from APs 120(1)~120(M) to STAs 110(1)~110(N) may be notated with parameters $N_{ap}$ (denoting the total number of coordinated APs), $N_{sta}$ (denoting the total number of STAs supported by $N_{ap}$ coordinated APs), $N_{rxi}$ (denoting the number of receives at the $i^{th}$ STA), $N_{txi}$ (denoting the number of transmitters at the $i^{th}$ AP), and $N_{total\_tx}$ (with $N_{total\_tx}=N_{tx1}+N_{tx2}+ \ldots +N_{tx}(N_{ap})$). The APs may be scheduled to sound STAs sequentially. That is, when the p AP is sounding, channel response matrix $H_{ij}[N_{rxi} \times N_{txj}]$ is estimated at $i^{th}$ STA, I=1, . . . , $N_{sta}$.

In joint feedback, the sequential sounding imposes stringent synchronization requirements on the APs. For simplicity, it may be assumed that synchronization requirements are met during sequential sounding. The STAs may be scheduled to feedback channel responses from MAPs jointly. At the $i^{th}$ STA, a joint channel matrix may be formed as $H_i[N_{rxi} \times N_{total\_tx}]=[H_{i1}, H_{i2}, \ldots , H_{i(Nap)}]$. Also, at the $i^{th}$ STA, SVD may be performed on $H_i$ as $[U_i, S_i, V_i]=\text{SVD}(H_i)$. Moreover, at the $i^{th}$ STA, singular values diag($S_i$(1:$N_{rxi}$, 1:$N_{rxi}$)) and full dimension matrix $V_i$(1: $N_{total\_tx}$, 1:$N_{rxi}$) may be fed back to its associated AP. Then, compression methods may be used to feedback $V_{ci}$ as $V_{ci}$;=$V_i$(1: $N_{total\_tx}$, 1:$N_{rxi}$)·Rot\_$V_i$, where Rot\_$V_i$ is a $N_{rxi} \times N_{rxi}$ diagonal matrix, with each diagonal element being a complex phasor to rotate corresponding column of $V_i$, as $$\text{Rot\_V}_i = \begin{bmatrix} e^{j\theta_{i,1}} & 0 & 0 \\ 0 & \ddots & 0 \\ 0 & 0 & e^{j\theta_{i,Nrxi}} \end{bmatrix}$$

Under a proposed scheme in accordance with the present disclosure, in a first scenario (or Scenario 1), APs 120(1)~120(M) may initially be scheduled as JMAP to perform joint soundings and feedbacks, then APs 120(1)~120(M) may later be scheduled for CMAP or single-AP transmission. Under the proposed schedule, a first method (or Method 1) may be utilized to use existing joint sounding feedbacks for CMAP and single-AP transmission. To better facilitate description of Method 1, a description of feedbacks of different sizes (e.g., large V feedback and small V feedback) is provided below.

FIG. 2 illustrates an example scenario 200 of MAP sounding feedback in accordance with the present disclosure. In scenario 200, sounding from APs 120(1)~120(M) to STAs 110(1)~110(N) may be notated with parameters $N_{ap}$ (denoting the total number of coordinated APs), $N_{sta}$ (denoting the total number of STAs supported by $N_{ap}$ coordinated APs), $N_{rxi}$ (denoting the number of receives at the $i^{th}$ STA), and $N_{txi}$ (denoting the number of transmitters at the $i^{th}$ AP) to refer to the $i^{th}$ STA and the $j^{th}$ AP, i=1, 2, . . . , $N_{sta}$, j=1, 2, . . . , $N_{ap}$. In part (A) of FIG. 2, the configuration is 2 APs→2 STAs, in which STA1 is associated with AP1 and STA2 is associated with AP2. In part (B) of FIG. 2, the configuration is 3 APs→3 STAs. In scenario 200, all APs may jointly sound $N_{total\_tx}$ spatial time streams, where:

$N_{total\_tx}=N_{tx1}+N_{tx2}+ \ldots +N_{txNap}$

Figure 3:
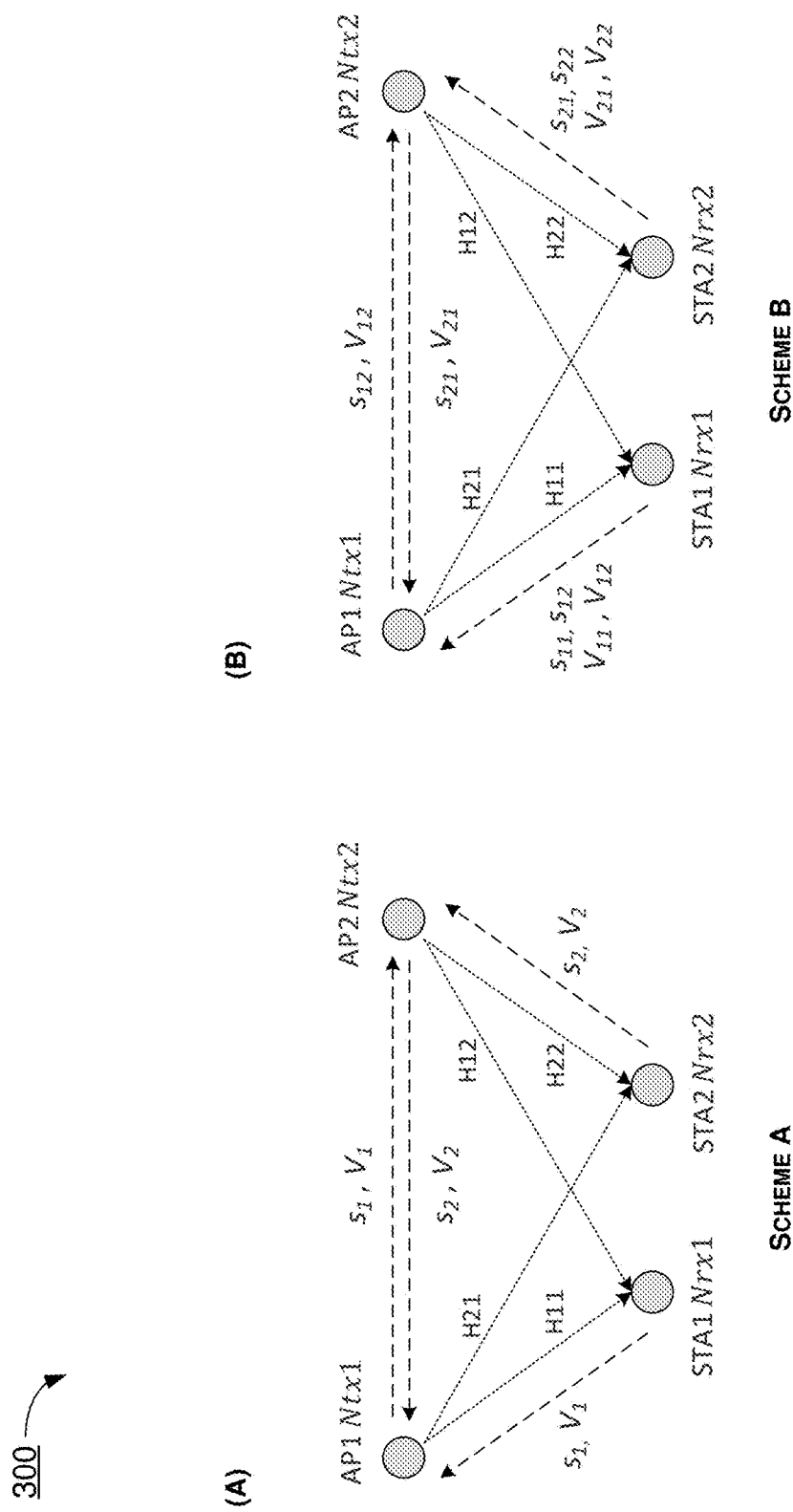
FIG. 3 is a diagram of an example scenario in accordance with the present disclosure.
Figure 4:
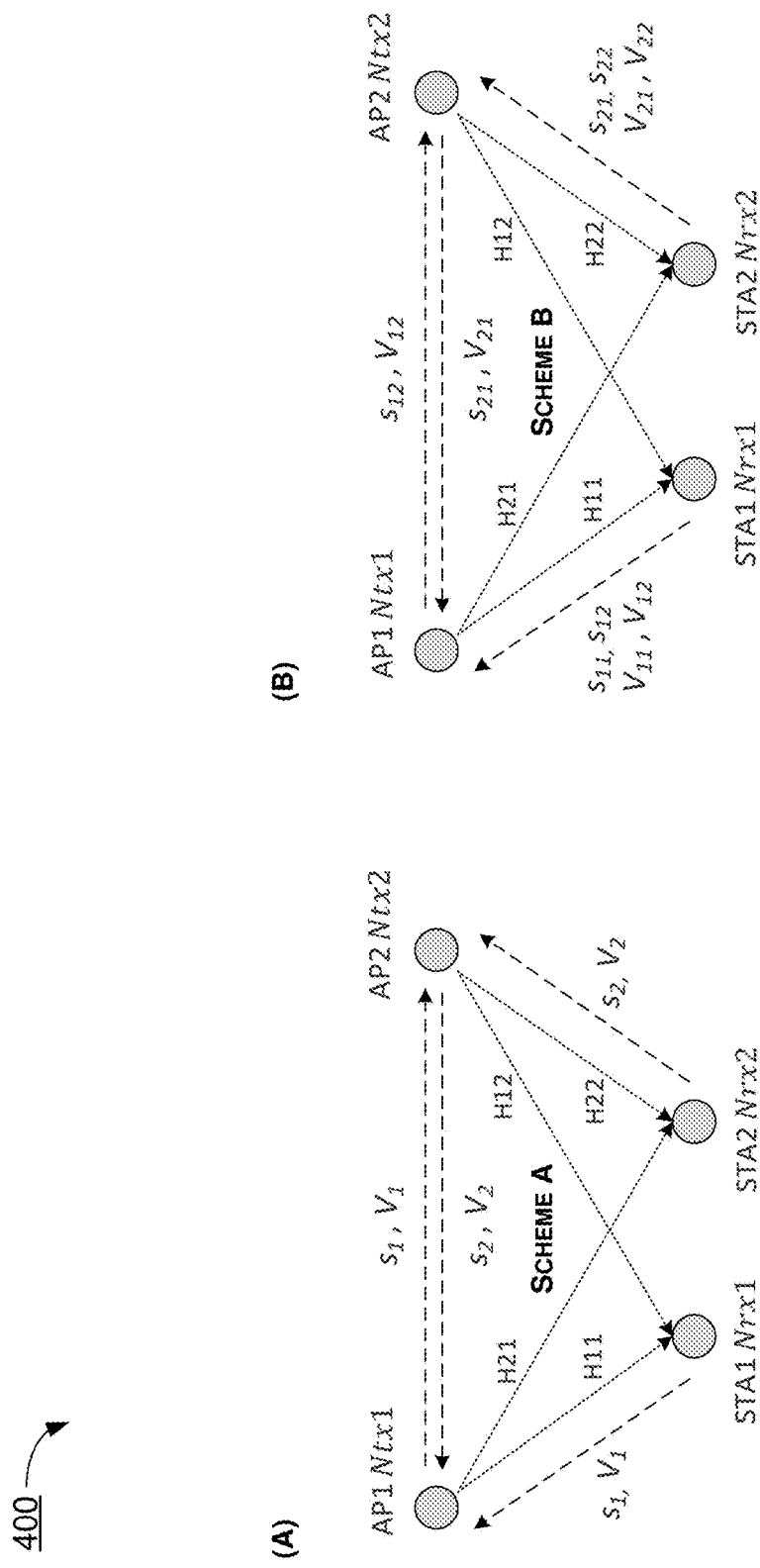
FIG. 4 is a diagram of an example scenario in accordance with the present disclosure.
Figure 6:
FIG. 6 is a diagram of an example scenario in accordance with the present disclosure.

FIG. 3 illustrates an example scenario 300 in accordance with the present disclosure. FIG. 4 illustrates an example scenario 400 in accordance with the present disclosure. Each of scenario 300 and scenario 400 shows a first feedback scheme (Scheme A) and a second feedback scheme (Scheme B). Part (A) of FIG. 3 shows Scheme A, which pertains to large V, and part (B) of FIG. 3 shows Scheme B, which pertains to small V. Similarly, part (A) of FIG. 4 shows Scheme A, which pertains to large V, and part (B) of FIG. 4 shows Scheme B, which pertains to small V. In Scheme A, the $i^{th}$ STA may provide feedback on singular values and large V matrix decomposed from H, for JMAP transmission. It is noteworthy that these feedbacks may also be used for reduced set JMAP, CMAP and single-AP transmitter beamforming. In Scheme B, the $i^{th}$ STA may provide feedback on singular values and small V matrix decomposed from $H_{ij}$ for CMAP and single-AP transmission only. It is noteworthy that these feedbacks may not be used for JMAP transmission without also feeding back extra information.

With respect to large V feedbacks, during transmission of a joint sounding packet, channel response matrix $H_i[N_{rxi} \times N_{total\_tx}]$ may be estimated for the $k^{th}$ SC at the $i^{th}$ STA (e.g., $i^{th}$ user). For simplicity, the SC index k may be dropped from all notations. Moreover, $H_{ij}$ may be extracted from H, according to spatial time stream index of each AP during sounding. Here, $H_{ij}$ denotes the channel matrix of the $i^{th}$ STA from the $i^{th}$ AP. For joint feedback, SVD may be performed on $H_i$ as $$H_i = U_i \cdot S_i \cdot V'_i$$

Also, $N_{rxi}$ singular values $\text{diag}(S_i(1:N_{rxi}, 1:N_{rxi}))$ and corresponding full dimension matrix $V_i(1: N_{total\_tx}, 1:N_{rxi})$ may be fed back. Then, compression methods may be used to compress $V_i(1: N_{total\_tx}, 1:N_{rxi})$ and provide feedback on $V_{ci}$ matrix as $V_{ci} = V_i \cdot \text{Rot\_}V_i$, where $\text{Rot\_}V_i$ is a $N_{rxi} \times N_{rxi}$ diagonal matrix, with each diagonal element being a complex phasor to rotate corresponding column of V as $$\text{Rot\_}V_i = \begin{bmatrix} e^{j\theta_{i,1}} & 0 & 0 \\ 0 & \ddots & 0 \\ 0 & 0 & e^{j\theta_{i,Nrxi}} \end{bmatrix}$$

Regarding derivation of small V feedbacks, for compressed feedback $V_{ci}$, reconstructed channel matrixes may be equivalent to the following:

$$rH_i = S_i \cdot V'_{ci} = S_i \cdot (V_i \cdot \text{Rot\_}V_i)'$$
$$= S_i \cdot \text{Rot\_}V'_i \cdot V'_i = \text{Rot\_}V'_i \cdot S_i \cdot V'_i$$

Here, $rH_i = \text{Rot\_}V'_i \cdot U'_i \cdot H_i$ and $rH_{ij} = rH_i[:, tx\_index_j]$, with $tx\_index_j$ being the transmitter index for the $i^{th}$ AP, $i=1, 2, \ldots, N_{sta}$. The above equation may also be written as $rH_i = [rH_{i1}, rH_{i2}, \ldots, rH_{ij}, \ldots]$. Since $rH_i = \text{Rot\_}V'_i \cdot U'_i \cdot H_i$ and $H_i = [H_{i1}, H_{i2}, \ldots, H_{ij}, \ldots]$, it follows that $rH_i = [\text{Rot\_}V'_i \cdot U'_i \cdot H_{i1}, \text{Rot\_}V'_i \cdot U'_i \cdot H_{i2}, \ldots, \text{Rot\_}V'_i \cdot U'_i \cdot H_{ij}, \ldots]$. Thus, the following may be obtained: $rH_{ij} = \text{Rot\_}V'_i \cdot U'_i \cdot H_{ij}$.

Thus, JMAP may fall back to single-AP transmitter beamforming or CMAP transmission such as coordinated OFDMA. With $rH_{ij} = \text{Rot\_}V'_i \cdot U'_i \cdot H_{ij}$ reconstructed from large V feedbacks, $$\text{Rot\_}V_i = \begin{bmatrix} e^{j\theta_{i,1}} & 0 & 0 \\ 0 & \ddots & 0 \\ 0 & 0 & e^{j\theta_{i,Nrxi}} \end{bmatrix}$$

and $U'_i$ is a unitary matrix. Accordingly, $(S_{ij}, V_{ij}) = \text{svd}(rH_{ij})$, which is equivalent to $(S_{ij}, V_{ij}) = \text{svd}(H_{ij})$. Thus, it may be observed that small V feedbacks may be reconstructed from large V feedbacks for single-AP transmission.

Regarding fallback to regrouped JMAP transmission, the $i^{th}$ and $k^{th}$ APs out of all joint-feedback APs may be regrouped for JMAP transmission. That is, the following may be reconstructed from large V feedbacks: $rH_{ij} = \text{Rot\_}V'_i \cdot U'_i \cdot H_{ij}$ and $rH_{ik} = \text{Rot\_}V'_i \cdot U'_i \cdot H_{ik}$. It is noteworthy that $$\text{Rot\_}V_i = \begin{bmatrix} e^{j\theta_{i,1}} & 0 & 0 \\ 0 & \ddots & 0 \\ 0 & 0 & e^{j\theta_{i,Nrxi}} \end{bmatrix}$$

and $U'_i$ is a unitary matrix. Accordingly, $(S_{ij}, V_{ij}) = \text{svd}([rH_{ij}, rH_{ik}]) = \text{svd}(\text{Rot\_}V'_i \cdot U'_i \cdot [H_{ij}, H_{ik}])$, which is equivalent to $(S_{ij}, V_{ij}) = \text{svd}([H_{ij}, H_{ik}])$. Thus, it may be observed that small V feedbacks may be reconstructed from large V feedbacks for re-grouped (or reduced-size) JMAP transmission. Additionally, since the $i^{th}$ and $k^{th}$ APs may be any APs and may be extended to represent a group of APs, this proof may also apply to JMAP falling back to CMAP transmission such as spatial reuse with nulling.

FIG. 5 illustrates an example scenario 500 in accordance with the present disclosure. In scenario 500, a feedback size comparison is provided for two eight-antenna APs, each associated with one two-antenna STAs. FIG. 5 illustrates an example scenario 500 in accordance with the present disclosure. Scenario 600 is a continuation of scenario 500. In scenario 600, the total number of feedbacks for each STA may be (58+2)=60 under Scheme A and (52+4)=56 under Scheme B.

One usage scenario may be that APs 120(1)~120(M) initially scheduled for JMAP may later be scheduled for JMAP, CMAP or single-AP transmission when one AP lost its clear channel assessment (CCA). That is, MAPs may be initially scheduled as JMAP, and APs 120(1)~120(M) may require large V sounding feedbacks for joint transmission. In this usage scenario, after joint sounding feedback (e.g., large V), CCA of one of the coordinated APs may not be clear. While other APs may use large V feedbacks, those other APs may regroup themselves and their associated STAs for JMAP transmission. Alternatively, those other APs may also use large V feedbacks and regroup themselves and their associated STAs for CMAP transmission, such as spatial reuse with nulling. Still alternatively, those other APs may also use large V feedbacks and regroup themselves and their associated STAs for single-AP transmitter beamforming.

Another usage scenario may be that APs 120(1)~120(M) initially scheduled for JMAP may later be scheduled for single-AP transmission when one AP has remaining data to send. That is, MAPs may be initially scheduled as JMAP, and APs 120(1)~120(M) may require large V sounding feedbacks for joint transmission. In this usage scenario, after joint transmissions, one AP may still has data to send and it may perform single-AP transmitter beamforming to its associated STA(s). In the previous usage scenario, one AP lost its CCA clearance during JMAP transmission, which may be temporary and may be recovered by the time the other APs completed transmission. The AP may resort to single-AP transmitter beamforming to transmit the remaining data to its associated STA(s).

From the above, it may be seen that the feedback overheads for large V feedbacks and small V feedbacks are similar, although extra computation may be required for large V feedbacks. Nevertheless, large V feedbacks may enable all the different types of MAP transmission modes, namely: JMAP, CMAP and single-AP transmitter beamforming. It is noteworthy that small V feedbacks may not be used to reconstruct large V for joint transmissions without feedback of extra information.

Under the proposed Method 1, which pertains to JMAP joint sounding feedback supporting CMAP transmission, CMAP transmissions may be supported with jointly fed back CSI from the joint sounding of JMAP. In the interest of brevity, the following notation is used throughout the present disclosure: $i=1, 2, \ldots, N_{sta}$, $j=1, 2, \ldots, N_{ap}$, and the $i^{th}$ STA is associated with $j^{th}$ AP.

With respect to joint sounding under Method 1, MAPs (e.g., APs 120(1)~120(M)) may be sounded jointly and work as JMAP initially. The $i^{th}$ STA may estimate $H_{ij}$ and construct $H_i = [H_{i1}, H_{i2}, \ldots, H_{i(Nap)}]$, with H, having full dimension $N_{rxi} \times N_{total\_tx}$. The joint sounding may also impose stringent synchronization requirements on the MAPs. Nevertheless, it may be assumed that synchronization requirements are met during sequential sounding.

With respect to jointly fed-back CSI under Method 1, the $i^{th}$ STA may perform SVD on $H_i$: $H_i = U_i \cdot S_i \cdot V'_i$. The $i^{th}$ STA may provide feedback on $N_{rxi}$ singular values in $S_i$ and corresponding full dimension matrix $V_i(1: N_{total\_tx}, 1:N_{rxi})$, which may be uncompressed or compressed. Here, it may be assumed that all fed-back CSIs may be available at all APs 120(1)~120(M).

With respect to precoding as JMAP under Method 1, at the $j^{th}$ AP, $rH_i[N_{rxi} \times N_{total\_tx}]$ may be reconstructed from singular values and V, vectors that are fed back, as shown below. Moreover, $rH_i[N_{rxi} \times N_{total\_tx}]$ may be used to calculate precoding and transmitter beamforming steering matrix, as shown below.

For EHT JMAP transmission, sounding feedbacks from joint MAP sounding may be used. The $j^{th}$ AP may use the fed-back singular values and $V_i$ (or $V_{ci}$) vectors from the $i^{th}$ STA to reconstruct $rS_i$, $rV_i$, $rV_{ci}$ i=1, ..., $N_{sta}$. At the $j^{th}$ AP, channel matrixes may be reconstructed for the $i^{th}$ STA as For uncompressed $V_i$ feedback: $rH_i = S_i \cdot V'_i \rightarrow H_i = U_i \cdot rH_i$ For compressed $V_{ci}$ feedback: $rH_i = rS_i \cdot rV_{ci} = S_i \cdot V_{ci} = S_i \cdot (V_i \cdot Rot\_V_i)' = S_i \cdot Rot\_V'_i \cdot V'_i = Rot\_V'_i \cdot S_i \cdot V'_i \rightarrow H_i = U_i \cdot Rot\_V_i \cdot rH_i$ Regarding precoding and transmitter beamforming for JMAP, at the $j^{th}$ AP, for the $i^{th}$ STA, precoding matrix $Q_i = \text{Null}(\widetilde{rH_i})$ may be determined, with $\widetilde{rH_i} = [rH_1; \ldots; rH_{i-1}; rH_{i+1}; \ldots; rH_{Nsta}]$. At the $j^{th}$ AP, for the $i^{th}$ user (e.g., $i^{th}$ STA), transmitter beamforming steering matrix W may be determined by projecting the $i^{th}$ user's reconstructed $rH_i$ to the null space of other users, or $rH_i \cdot Q_i$, thus: $[U_{pi}, S_{pi}, V_{pi}] = \text{SVD}(rH_i \cdot Q_i) \rightarrow W_i = V_{pi}(:, 1:N_{stsi})$. At the $j^{th}$ AP, the $i^{th}$ user vector $x_i$ may be weighted with $Q_i \cdot W_i$, and the combined transmission signal may be $tx[N_{total\_tx} \times 1]$, with $tx = Q_1 \cdot W_1 \cdot x_1 + \ldots + Q_i \cdot W_i \cdot x_i + \ldots + Q_{Nsta} \cdot W_{Nsta} \cdot x_{Nsta}$. At the $j^{th}$ AP, the rows of tx vector may be mapped to its own transmitters according to index of its transmitters. Accordingly, total received signal at the $i^{th}$ STA may be expressed as: $rx_i = H_i \cdot tx = (H_i \cdot Q_1) \cdot W_1 \cdot x_1 + \ldots + (H_i \cdot Q_i) \cdot W_i \cdot x_i + \ldots + (H_i \cdot Q_{Nsta}) \cdot W_{Nsta} \cdot x_{Nsta}$.

It is noteworthy that orthogonality between users in JMAP transmission may be achieved. That is, since $Q_i = \text{Null}([rH_1; \ldots; rH_{-1}; \ldots; rH_{+1}; \ldots; rH_{Nsta}])$, then $rH_i \cdot Q_j = 0$ for $i \neq j$. This is because $H_i = U_i \cdot rH_i$ or $H_i = U_i \cdot Rot\_V_i \cdot rH_i$, we have $H_i \cdot Q_j = 0$ for $i \neq j$. In $rx_i$, all received signal terms from interfering users are 0, and thus $rx_i = H_i \cdot Q_i \cdot W_i \cdot x_i$. In addition, orthogonality between sts within the $i^{th}$ user in JMAP transmission may also be achieved. For uncompressed $V_i$ feedback $H_i = U_i \cdot rH_i$, and $rx_i = H_i \cdot Q_i \cdot W_i \cdot x_i = U_i \cdot (rH_i \cdot Q_i \cdot W_i) \cdot x_i = U_i \cdot U_{pi} \cdot S_{pi} \cdot x_i$. Here, $U_i \cdot U_{pi}$ is a unitary matrix, and orthogonality between sts is proven as $(U_i \cdot U_{pi})' \cdot rx_i = S_{pi} \cdot x_i$. For compressed $V_{ci}$ feedback $rH_i = Rot\_V'_i \cdot S_i \cdot V'_i \rightarrow H_i = U_i \cdot Rot\_V_i \cdot rH_i$, $rx_i = H_i \cdot Q_i \cdot W_i \cdot x_i = U_i \cdot Rot\_V_i \cdot (rH_i \cdot Q_i \cdot W_i) \cdot x_i = U_i \cdot Rot\_V_i \cdot U_{pi} \cdot S_{pi} \cdot x_i$. Here, $U_i \cdot Rot\_V_i \cdot U_{pi}$ is also a $N_{stsi} \times N_{stsi}$ unitary matrix, with $(U_i \cdot Rot\_V_i \cdot U_{pi})' \cdot rx_i = S_{pi} \cdot x_i$.

With respect to precoding as CMAP under Method 1, at the $j^{th}$ AP, for the $i^{th}$ STA, $rH_i[N_{rxi} \times N_{total\_tx}]$ may be reconstructed from fed-back singular values and vectors in $V_i$. That is, diagonal matrix $rS_i[N_{rxi} \times N_{rxi}]$, $rV_i[N_{total\_tx} \times N_{rxi}]$ may be reconstructed from fed-back singular values and V, vectors. Additionally, $rH_i = rS_i \cdot rV'_i$ may also be reconstructed. For theoretical analysis, it may be assumed that there is no computational loss during sounding feedback. Then, reconstructed channel matrixes may be equivalent to $rH_i = S_i \cdot V'_i$ for uncompressed feedback $V_i$ or $rH_i = S_i \cdot V'_{ci} = S_i \cdot (V_i \cdot Rot\_V_i)' = S_i \cdot Rot\_V'_i \cdot V'_i = Rot\_V'_i \cdot S_i \cdot V'_i$ for compressed feedback $V_{ci}$. It is noteworthy that the $S_i$ term in $rH_i$ reconstruction equations may be dropped for $Q_i$ calculation. Then, $rpH_{ij}[N_{rxi} \cdot N_{txj}]$ may be formed from $rH_i[N_{rxi} \times N_{total\_tx}]$, with $rpH_{ij} = rH_i[:, tx\_index_j]$, where $tx\_index_j$ is the transmitter index for the $j^{th}$ AP. The term $rpH_{ij}$ denotes a projection of $H_{ij}$. This notation is to indicate that it is different from reconstructed $rH_{ij}$ from sequential feedback. For uncompressed feedback, since $[rpH_{i1}, rpH_{i2}, \ldots, rpH_{ij}, \ldots] = rH_i = U_i' \cdot H_i = U_i' \cdot [H_{i1}, H_{i2}, \ldots, H_{ij}, \ldots] = [U_i' \cdot H_{i1}, U_i' \cdot H_{i2}, \ldots, U_i' \cdot H_{ij}, \ldots]$, then $rpH_{ij} = U_i' \cdot H_{ij}$. For compressed feedback, since $[rpH_{i1}, rpH_{i2}, \ldots, rpH_{ij}, \ldots] = rH_i = Rot\_V'_i \cdot U_i' \cdot H_i = [Rot\_V'_i \cdot U_i' \cdot H_{i1}, Rot\_V'_i \cdot U_i' \cdot H_{i2}, \ldots, Rot\_V'_i \cdot U_i' \cdot H_{ij}, \ldots]$, then $rpH_{ij} = Rot\_V'_i \cdot U_i' \cdot H_{ij}$.

For precoding and transmitter beamforming for CMAP transmission, for illustrative purposes and without limitation, block diagonalization (BD0 precoding algorithm is used in the present disclosure to achieve orthogonality between STAs. Regularized block diagonalization (RBD) and other algorithms may be used for better performance. Accordingly, assuming that the $i^{th}$ STA may be connected with the $j^{th}$ AP, precoding matrix Q, and transmitter beamforming steering matrix $W_i$ may be derived for the $i^{th}$ STA and the $j^{th}$ AP. At the $j^{th}$ AP, precoding matrix $Q_i = \text{Null}(\widetilde{rH_{ij}})$ may be determined, where $\widetilde{rH}_{ij} = [rpH_{1j}; \ldots; rpH_{(i-1)j}; rpH_{(i+1)j}; \ldots; rpH_{(Nsta)j}]$. At the $j^{th}$ AP, for the $i^{th}$ user (e.g., the $i^{th}$ STA), transmitter beamforming steering matrix $W_i$ may be determined by projecting reconstructed $rpH_{ij}$ of the $i^{th}$ user to the null space of other users: $rpH_{ij} \cdot Q_i$. Thus, $[U_{pi}, S_{pi}, V_{pi}] = \text{SVD}(rpH_{ij} \cdot Q_i) \rightarrow W_i = V_{pi}(:, 1:N_{stsi})$. The $j^{th}$ AP may transmit the spatial streams vectors $x_i$ of the $i^{th}$ user as $Q_i \cdot W_i \cdot x_i$. Accordingly, with respect to the total transmission $tx_j[N_{txj} \times 1]$ of the $j^{th}$ AP, the $j^{th}$ AP may support $N_{staj}$ STAs, indexing from i to $i+N_{staj}-1$, with $tx_j = Q_i \cdot W_i \cdot x_i + \ldots + Q_{i+Nstaj-1} \cdot W_{i+Nstaj-1} \cdot x_{i+Nstaj-1}$.

Moreover, for precoding as CMAP, signal may be received at the ti user (which is connected with the $j^{th}$ AP). Assuming that channels have not changed from sounding and ignoring noise at receivers for simplicity, total received signal at the $i^{th}$ STA may be expressed as $rx_i = H_{i1} \cdot tx_1 + \ldots + H_{i(Nap)} \cdot tx_{Nap} = H_{i1} \cdot Q_1 \cdot W_1 \cdot x_1 + \ldots + H_{ij} \cdot Q_i \cdot W_i \cdot x_i + \ldots + H_{i(Nap)} \cdot Q_{Nsta} \cdot W_{Nsta} \cdot x_{Nsta}$.

Orthogonality between users in CMAP transmission may be achieved, as explained below. For uncompressed $V_i$ feedback, $rpH_{ij} = U_i' \cdot H_{ij} \rightarrow H_{ij} = U_i \cdot rpH_{ij}$, and $rx_i = U_i \cdot (rpH_{i1} \cdot Q_1) \cdot W_1 \cdot x_1 + \ldots + U_i \cdot (rpH_{ij} \cdot Q_i) \cdot W_i \cdot x_i + \ldots + U_i \cdot (rpH_{i(Nap)} \cdot Q_{Nsta}) \cdot W_{Nsta} \cdot x_{Nsta}$. For compressed $V_{ci}$ feedback, $rpH_{ij} = Rot\_V'_i \cdot U_i' \cdot H_{ij} \rightarrow H_{ij} = U_i \cdot Rot\_V_i \cdot rpH_{ij}$, and $rx_i = U_i \cdot Rot\_V_i \cdot (rpH_{i1} \cdot Q_1) \cdot W_1 \cdot x_1 + \ldots + U_i \cdot Rot\_V_i \cdot (rpH_{ij} \cdot Q_i) \cdot W_i \cdot x_i + \ldots + U_i \cdot Rot\_V_i \cdot (rpH_{i(Nap)} \cdot Q_{Nsta}) \cdot W_{Nsta} \cdot x_{Nsta}$. Since $Q_i = \text{Null}([rpH_{1j}; \ldots; rpH_{(i-1)j}; rpH_{(i+1)j}; \ldots; rpH_{(Nsta)j}])$, $rpH_{ij}$ may be orthogonal to all Qs except $Q_i$. Thus, all terms in $rx_i$ are 0 except the one with $rpH_{ij} \cdot Q_i$, which leads to the desired signal at the $i^{th}$ STA. Accordingly, it may be seen that multi-users in CMAP transmission are orthogonal, and the received signal at the P STA may become $rx_i = H_{ij} \cdot Q_i \cdot W_i \cdot x_i$.

Orthogonality between sts with the $i^{th}$ user in CMAP transmission may also be achieved, as explained below. For uncompressed Vi feedback, $rx_i = U_i \cdot (rpH_{ij} \cdot Q_i \cdot W_i) \cdot x_i = U_i \cdot U_{pi} \cdot S_{pi} \cdot x_i$. Since $U_i \cdot U_{pi}$ is a $N_{stsi} \times N_{stsi}$ unitary matrix, it may be proven that the spatial streams of the $i^{th}$ user are orthogonal as $(U_i \cdot U_{pi})' \cdot rx_i = S_{pi} \cdot x_i$. For compressed $V_{ci}$ feedback, $rx_i = U_i \cdot Rot\_V_i \cdot (rpH_{ij} \cdot Q_i \cdot W_i) \cdot x_i = U_i \cdot Rot\_V_i \cdot U_{pi} \cdot S_{pi} \cdot x_i$, where $U_i \cdot Rot\_V_i \cdot U_{pi}$ is also a $N_{stsi} \times N_{stsi}$ unitary matrix, it may be proven that the spatial streams of the $i^{th}$ user are orthogonal as $(U_i \cdot Rot\_V_i \cdot U_{pi})' \cdot rx_i = S_{pi} \cdot x_i$.

With respect to precoding as single AP under Method 1, assuming the p AP (or AP) supports $N_{staj}$ STAs, with indexing from $STA_i$ to $STA_{i+Nstaj-1}$, the same procedure described above regarding precoding as CMAP may be utilized to reconstruct $rpH_{ij}[N_{rxi} \times N_{tx1}]$ from $rH_i[N_{rxi} \times N_{total\_tx}]$. That is, $rpH_{ij} = rH_i[:, tx\_index_j]$, $i=i, \ldots, i+N_{staj}-1$, where $tx\_index_j$ is the transmitter index for the $j^{th}$ AP. Moreover, for precoding and transmitter beamforming for single-AP transmission, the same procedure described above regarding precoding as CMAP may be utilized to determine $Q_i$ to achieve block diagonalization for multiple users supported by the $j^{th}$ AP, and beamforming matrix $W_i$ may be determined for the $i^{th}$ user. Thus, for combined $AP_j$ transmission $tx_j[N_{txj} \times 1]$, $tx_j = Q_i \cdot W_i \cdot x_i + \ldots + Q_{i+Nstaj-1} \cdot x_{i+Nstaj-1}$. The received signal at the $i^{th}$ user may be $rx_i = H_{ij} \cdot tx_j = H_{ij} \cdot Q_i \cdot W_i \cdot x_i + \ldots + H_{ij} \cdot Q_{j+Nstaj-1} \cdot W_{j+Nstaj-1} \cdot x_{j+Nstaj-1}$.

Orthogonality between multiple users in single-AP transmission may be achieved, as explained below. For uncompressed $V_i$ feedback, $H_{ij} = U_i \cdot rpH_{ij}$, and $rx_i = U_i \cdot (rpH_{ij} \cdot Q_i) \cdot W_i \cdot x_i + \ldots + U_i \cdot (rpH_{ij} \cdot Q_{j+Nstaj-1}) \cdot W_{j+Nstaj-1} \cdot x_{j+Nstaj-1}$. For compressed $V_{ci}$ feedback, $H_{ij} = U_i \cdot Rot\_V_i \cdot rpH_{ij}$, and $rx_i = U_i \cdot Rot\_V_i \cdot (rpH_{ij} \cdot Q_i) \cdot W_i \cdot x_i + \ldots + U_i \cdot Rot\_V_i \cdot (rpH_{ij} \cdot Q_{j+Nstaj-1}) \cdot W_{j+Nstaj-1} \cdot x_{j+Nstaj-1}$. Since $Q_i = \text{Null}[(rpH_{(i+1)j}; \ldots ;rpH_{(i+Nstaj-1)j}])$, all received signal terms in $rx_i$ are 0 except $rpH_{ij} \cdot Q_i \cdot W_i$, which is the desired signal. Thus, it may be proven that multiple users in CMAP transmission are orthogonal. Then, the received signal at the $i^{th}$ STA may become $rx_i = H_{ij} \cdot Q_i \cdot W_i \cdot x_i$. Orthogonality between sts with the $i^{th}$ user in single-AP transmission may also be proven by following the procedure described above regarding precoding as CMAP.

Under another proposed scheme in accordance with the present disclosure, in a second scenario (or Scenario 2), APs 120(1)~120(M) may initially be scheduled as CMAP to perform joint or sequential soundings and perform sequential feedbacks, then APs 120(1)~120(M) may later be scheduled for JMAP or single-AP transmission. Under the proposed schedule, the sequential sounding feedback procedure described above may be utilized for single-AP transmission. Specifically, the $j^{th}$ STA may provide feedback on $H_{ij}$ to its associated $j^{th}$ AP. In such cases, the $j^{th}$ AP would not coordinate with other APs and would receive CSI form its associated users (e.g., STAs with index i, . . . , $i+N_{staj}-1$). Moreover, the j AP would perform single-AP transmission without coordinating with other APs.

Under the proposed scheme, in Scenario 2, a second method (or Method 2) may be utilized to provide feedback on CSI sequentially to support JMAP transmission. At the $i^{th}$ STA, for $H_{ij}$, in addition to basic sequential feedbacks (e.g., $S_{ij}$ and $V_{ij}$ described above), the feedback may include an extra unitary matrix $eU_{ij}[N_{rxi} \times N_{rxi}]$ for j>1. When compressed methods are used to provide feedback on $V_{ij}$ vectors, in addition to feedback on $V_{cij}$ as in a basic sequential feedback, the feedback may include an extra phase vector $ePh\_V_{ij}[N_{rxi} \times 1]$ as $ePh\_V_{ij}=[\theta_{ij,1}, \theta_{ij,2}, \ldots, \theta_{ij,Nrxi}]$. Under Scheme A, the feedback may also include phase rotation vectors $ePh\_V_{ij}$, for j=1, . . . , $N_{ap}$. Columns of $V_{ij}$ may be rotated by a corresponding phase value in $ePh\_V_{ij}$ to derive $V_{cij}$. Under Scheme B, the feedback may also include a phase rotation vector $ePh\_V_{ij}$, for j=1 only.

Under the proposed scheme, Method 2 may support JMAP transmissions with sequentially fed-back CSI from sequential sounding from CMAP. With respect to sequential sounding, MAPs (e.g., AP 120(1)~120(M)) may be sounded sequentially, functioning as CMAP or single-APs initially. The $i^{th}$ STA may estimate channel matrix $H_{ij}[N_{rxi} \times N_{txi}]$ when the $j^{th}$ AP is sounding. The sequential sounding may also impose stringent synchronization requirements on the MAPs in case allowed for JMAP transmission. For simplicity, it may be assumed that synchronization requirements are met during sequential sounding. With respect to sequentially fed-back CSI, STAs 110(1)~110(N) may be scheduled to provide feedback for $H_{ij}$ sequentially. For the $i^{th}$ STA, theoretically any one of $U_{ij}$ may be used as reference to derived other extra feedback matrix $eU_{ij}$ of $U_{ij}$. For simplicity, $U_{1j}$ may be chosen as reference in the following $eU_{ij}$ feedback description. Additionally, $eU_{ij}$ may be derived as described below and fed back for j>1. When the $i^{th}$ STA is scheduled to provide feedback on CSI, the $i^{th}$ STA may perform SVD on matrix $H_{ij}$: $H_{ij}=U_{ij} \cdot S_{ij} \cdot V_{ij}'$. With uncompressed $V_{ij}$ feedback, the $i^{th}$ STA may sequentially provide feedback on $N_{rxi}$ singular values in $S_{ij}$ and corresponding vectors in $V_{ij}$ during sequential feedback as described above. The $i^{th}$ STA may also sequentially provide feedback on extra unitary matrix $eU_{ij}[N_{rxi}, N_{rxi}]$ to align $U_{ij}$, and $eU_{ij}$ may be derived as $eU_{ij}=U_{i1}' \cdot U_{ij}$, j=2, . . . , $N_{ap}$.

In Method 2, with compressed $V_{cij}$ feedback and under Scheme A, the $i^{th}$ STA may sequentially provide feedback on $N_{rxi}$ singular values in $S_{ij}$ and corresponding vectors in compressed $V_{cij}$ during sequential feedback. The $i^{th}$ STA may also sequentially provide feedback on the phase rotation vector $ePh\_V_{ij}[1 \times N_{rxi}]$ with which columns of $V_{ij}$ are rotated during compression, as $ePh\_V_{ij}=[\theta_{ij,1}, \theta_{ij,2}, \ldots, \theta_{ij,Nrxi}]$, j=1, 2, . . . , $N_{ap}$. The $i^{th}$ STA may further sequentially provide feedback on extra unitary matrix $eU_{ij}[N_{rxi} \times N_{rxi}]$ to align $U_{ij}$ ($j \neq 1$) to $U_{i1}$, as $eU_{ij}=U_{i1}' \cdot U_{ij}$, j=2, . . . , $N_{ap}$.

In Method 2, with compressed $V_{cij}$ feedback, Scheme B may be an optimized version of Scheme A to minimize feedback transmission. That is, under Scheme A, the $i^{th}$ STA would provide feedback on $N_{ap}$ phase rotation vectors $ePh\_V_{ii}$ j=1, 2, . . . , $N_{ap}$. In contrast, under Scheme B, the $i^{th}$ STA would only provide feedback on one phase rotation vector $ePh\_V_{i1}$. Since $eU_{i1}$ is chosen for feedback, the feedback may be provided for $ePh\_V_{i1}$ to minimize amount of feedback information. The $i^{th}$ STA may sequentially provide feedback on $N_{rxi}$ singular values in $S_{ij}$ and corresponding vectors in compressed $V_{cij}$ during sequential feedback. The $i^{th}$ STA may also provide feedback on one phase vector $ePh\_V_{i1}[1 \times N_{rxi}]$ for AP1, with which columns of $i^{th}$ are rotated during compression, as $ePh\_V_{i1}=[\theta_{i1,1}, \theta_{i1,2}, \ldots, \theta_{i1,Nrxi}]$, j=1. The $i^{th}$ STA may further sequentially provide feedback on extra unitary matrix $eU_{ij}[N_{rxi}, N_{rxi}]$ to align $U_{ij}(j \neq 1)$ to $U_{i1}$, as $eU_{ij}=Rot\_V_{i1} \cdot U_{i1}' \cdot U_{ij} \cdot Rot\_V_{ij}$, j=2, . . . , $N_{ap}$, where $Rot\_V_{ij}$ rotates columns of $V_{ij}$ to obtain compressed $V_{cij}$.

In Method 2, with respect to compression of $eU_{ij}$, in case methods used to compress $V_{ij}$ are also used to compress $eU_{ij}$ for feedback, both compressed matrix and rotation angles need to be fed back to re-construct $eU_{ij}$ at APs 120(1)~120 (M). The sizes of $eU_{ij}[N_{rxi}, N_{rxi}]$ may be much smaller compared to $V_{ij}[N_{rxi}, N_{txj}]$ in MAP configurations. Moreover, compression on $eU_{ij}$ may become less important. Compression methods may be further developed to reduce feedback transmission of $eU_{ij}$. For simplicity, uncompressed $eU_{ij}$ may be used in the following analysis.

With respect to precoding as JMAP, $rH_{ij}$ may be reconstructed. For simplicity, it may be assumed that fed-back CSIs from all STAs 110(1)~110(N) may be available at all APs 120(1)~120(M). The $j^{th}$ AP may reconstruct the following matrixes, if applicable, from fed-back CSIs:

$rS_{ij}=S_{ij}, rV_{ij}=V_{ij}$, or $rV_{ij}=V_{cij}$ $reU_{ij}=eU_{ij}$, for j>1

Here, $\text{rePh\_V}_{ij} = \text{ePh\_V}_{ij} = [\theta_{ij,1}, \theta_{ij,2}, \ldots, \theta_{ij,Nrxi}]$
$\Rightarrow \text{rRot\_V}_{ij} =$ $$\text{Rot\_V}_{ij} = \begin{bmatrix} e^{j\theta_{ij,1}} & 0 & 0 \\ 0 & \ddots & 0 \\ 0 & 0 & e^{j\theta_{ij,Nrxi}} \end{bmatrix}$$

The $j^{th}$ AP may reconstruct $\text{rH}_{ij}[N_{rxi} \times N_{txj}]$ for the $i^{th}$ STA. For uncompressed V, the reconstruction may be expressed as $\text{rH}_{ij} = rS_{ij} \cdot rV_{ij}' = S_{ij} \cdot V_{ij}'$, for $j=1$ $\text{rH}_{ij} = reU_{ij} \cdot rS_{ij} \cdot rV_{ij}' = eU_{ij} \cdot S_{ij} \cdot V_{ij}'$, for $j>1$ For compressed V, Scheme A may involve non_combine_eU_Ph as $\text{rH}_{ij} = rS_{ij} \cdot r\text{Rot\_V}_{ij} \cdot rV_{ij}' = S_{ij} \cdot V_{ij}'$, for $j=1$ $\text{rH}_{ij} = reU_{ij} \cdot rS_{ij} \cdot r\text{Rot\_V}_{ij} \cdot rV_{ij}' = eU_{ij} \cdot S_{ij} \cdot V_{ij}'$, for $j>1$ For compressed V, Scheme B may involve combine_eU_Ph $M_{ij}$ as $\text{rH}_{ij} = rS_{ij} \cdot r\text{Rot\_V}_{ij} \cdot rV_{ij}' = S_{ij} \cdot V_{ij}'$, for $j=1$ $\text{rH}_{ij} = r\text{Rot\_V}_{i1}' \cdot reU_{ij} \cdot rS_{ij} \cdot rV_{ij}' = \text{Rot\_V}_{i1}' \cdot eU_{ij} \cdot \text{Rot\_V}_{ij}' \cdot S_{ij} \cdot V_{ij}'$, for $j>1$ Thus, for uncompressed V:

$H_{ij} = U_{ij} \cdot rH_{ij}$, for $j=1$ $H_{ij} = U_{i1} \cdot rH_{ij}$, for $j>1$ For compressed V, for non_combine_eU_Ph under Scheme A:

$H_{ij} = U_{ij} \cdot rH_{ij}$, for $j=1$ $H_{ij} = U_{i1} \cdot rH_{ij}$, for $j>1$ For compressed V, for combine_eU_Ph under Scheme B:

$H_{ij} = U_{ij} \cdot rH_{ij}$, for $j=1$ $H_{ij} = U_{i1} \cdot rH_{ij}$, for $j>1$ Accordingly, the following may be obtained: $H_{ij} = U_{i1} \cdot rH_{ij}$.

With respect to precoding as JMAP, $rH_i$ may be reconstructed for JMAP precoding from $rH_{ij}$, as $rH_i = [rH_{i1}, \ldots, rH_{ij}, \ldots, rH_{iNap}]$. With respect to precoding and transmitter beamforming, at the $j^{th}$ AP, for the $i^{th}$ STA, precoding matrix $Q_i = \text{Null}(\widetilde{rH_i})$ may be determined, where $\widetilde{rH_i} = [rH_1; \ldots; rH_{i-1}; rH_{i+1}; \ldots; rH_{Nsta}]$. At the $j^{th}$ AP, for the $i^{th}$ user (e.g., the $i^{th}$ STA), transmitter beamforming steering matrix W may be determined. For instance, the reconstructed of the $i^{th}$ user may be projected to the null space of other users as $rH_i \cdot Q_i$. Thus, $[U_{pi}, S_{pi}, V_{pi}] = \text{SVD}(rH_i \cdot Q_i) \rightarrow W_i = V_{pi}(:, 1:N_{stsi})$. At the $j^{th}$ AP, the $i^{th}$ user vector $x_i$ may be weighted with $Q_i \cdot W_i$. The combined transmission signal may be $tx[N_{total\_tx} \times 1]$, where $tx = Q_1 \cdot W_1 \cdot x_1 + \ldots + Q_i \cdot W_i \cdot x_i + \ldots + Q_{Nsta} \cdot W_{Nsta} \cdot x_{Nsta}$. At the $j^{th}$ AP, the rows of tx vector may be mapped to transmitters of the $j^{th}$ AP according to index of its transmitters. The total received signal at the $i^{th}$ STA may be as $rx_i = H_i \cdot tx = (H_i \cdot Q_1) \cdot W_1 \cdot x_1 + \ldots + (H_i \cdot Q_i) \cdot W_i \cdot x_i + \ldots + (H_i \cdot Q_{Nsta}) \cdot W_{Nsta} \cdot x_{Nsta}$.

Orthogonality between users in JMAP transmission may be achieved, as explained below. Since $Q_i = \text{Null}([rH_1; \ldots; rHi_{-1}; rH_{i+1}; \ldots; rHNsta])$, then $rH_i \cdot Q_j = 0$ for $i \ne j$. As described above, $H_{ij} = U_{i1} \cdot rH_{ij}$, and thus $rH_i = U_{i1}' \cdot [H_{i1}, \ldots, H_{ij}, \ldots, H_{iNap}] = U_{i1}' \cdot H_i$ and $H_i \cdot Q_j = U_{i1} \cdot rH_i \cdot Q_j = 0$ for $i \ne j$.

Accordingly, in $rx_i$, all received signal terms from interfering users are 0, and $rx_i = H_i \cdot Q_i \cdot W_i \cdot x_i$.

Orthogonality between sts within the $i^{th}$ user in JMAP transmission may be achieved, as explained below. For both uncompressed and compressed V feedback $H_i = U_{i1} \cdot rH_i$, the following may be obtained: $rx_i = H_i \cdot Q_i \cdot W_i \cdot x_i = U_{i1} \cdot (rH_i \cdot Q_i \cdot W_i) \cdot x_i = U_{i1} \cdot U_{pi} \cdot S_{pi} \cdot x_i$, where $U_{i1} \cdot U_{pi}$ is a $N_{stsi} \times N_{stsi}$ unitary matrix, and orthogonality between sts may be proven as $(U_{i1} \cdot U_{pi})' \cdot rx_i = S_{pi} \cdot x_i$.

With respect to precoding as CMAP, reconstructed $rH_{ij}$ may be used, $i=1, 2, \ldots N_{sta}$, the $j^{th}$ AP may follow a procedure described below to calculate precoding and transmitter beamforming steering matrix for STAs that it supports. With respect to precoding as single AP, the same described above for precoding as CMAP may be applied. It is noteworthy that the number of $rH_{ij}$ that need to be reconstructed for JMAP and CMAP may be different. In case APs 120(1)~120(M) are configured as JMAP initially, each AP may reconstruct all $rH_{ij}$, $i=1, 2, \ldots, N_{sta}$, $j=1, 2, \ldots, N_{ap}$. There is no need to perform any more reconstruction of $rH_{ij}$ when APs 120(1)~120(M) are configured later to perform CMAP transmission. In case APs 120(1)~120(M) are configured as CMAP initially, the $j^{th}$ AP may choose to reconstruct and store only $rH_{ij}$, $i=1, 2, \ldots, N_{sta}$, for its current CMAP transmission. In case APs 120(1)~120(M) are later configured to perform JMAP transmission, the $j^{th}$ AP may need to reconstruct $rH_{ij}$, $i=1, 2, \ldots, N_{sta}$ $j=1, 2, \ldots, j-1, j+1, N_{ap}$, from stored CSI. Alternatively, the $j^{th}$ AP may choose to reconstruct and store all $rH_{ij}$, $i=1, 2, \ldots, N_{sta}$, $j=1, 2, \ldots, N_{ap}$, based on knowledge that the $j^{th}$ AP would be reconfigured for JMAP transmission.

With respect to EHT coordinated MAP transmission, the $j^{th}$ AP may use the fed-back singular values and $V_{ij}$ vectors from the $i^{th}$ STA to reconstruct $rH_{ij}$. For uncompressed $V_{ij}$ feedback, the reconstructed $rH_{ij}$ may be as $rH_{ij} = S_{ij} \cdot V_{ij} V_i'$. For compressed $V_{cij}$ feedback, the reconstructed $rH_{ij}$ may be as $rH_{ij} = S_{ij} \cdot (V_{ij} \cdot \text{Rot\_V}_{ij})' = S_{ij} \cdot \text{Rot\_V}_{ij}' \cdot V_{ij}' = \text{Rot\_V}_{ij}' \cdot S_{ij} \cdot V_{ij}'$. With respect to precoding and transmitter beamforming for CMAP transmission, precoding matrix $Q_i$ at the $j^{th}$ AP may be determined for the $i^{th}$ user. Assuming the $i^{th}$ STA is supported by the $j^{th}$ AP, precoding matrix for the $i^{th}$ user may be the null space of $\widetilde{rH}_{ij}$, as $Q_i = \text{Null}(\widetilde{rH}_{ij})$, where $\widetilde{rH}_{ij} = [rH_{1j}; \ldots; rH_{(i-1)j}; rH_{(i+1)j}; \ldots; rH_{(Nsta)j}]$. Moreover, transmitter beamforming steering matrix $W_i$ within the $i^{th}$ user may be determined. For instance, the reconstructed $rH_{ij}$ of the $i^{th}$ user may be projected to the null space of other users as $rH_{ij} \cdot Q_i$. The transmitter beamforming steering matrix for the $i^{th}$ user may be expressed as $W_i: [U_{pi}, S_{pi}, V_{pi}] = \text{SVD}(rH_{ij} \cdot Q_i)$, and $W_i = V_{pi}(:, 1:N_{stsi})$.

Regarding CMAP transmission at the $j^{th}$ AP, the $j^{th}$ AP may support $N_{staj}$ STAs, indexing from i to $i+N_{staj}-1$. The $i^{th}$ user vector $x_i$ may be weighted with $Q_i \cdot W_i$. The combined transmission signal may be $tx_j[N_{txj} \times 1]$, as $tx_j = Q_i \cdot W_i \cdot x_i + \ldots + Q_{i+Nstaj-1} \cdot W_{i+Nstaj-1} \cdot x_{i+Nstaj-1}$. Thus, the total received signal at the $i^{th}$ STA may be expressed as: $rx_i = H_{i1} \cdot tx_1 + \ldots + H_{i(Nap)} \cdot tX_{Nap} = H_{i1} \cdot Q_1 \cdot W_1 \cdot x_1 + \ldots + H_{ij} \cdot Q_i \cdot Q_i \cdot x_i + \ldots + H_{i(Nap)} \cdot Q_{Nsta} \cdot W_{Nsta} \cdot x_{Nsta}$.

Orthogonality between users in CMAP transmission may be achieved, as explained below. Since $Q_i = \text{Null}([rH_{1j}; \ldots; rH_{(i-1)j}; rH_{(i+1)j}; \ldots; rH_{(Nsta)j}])$, $rH_{ij} \cdot Q_j = 0$ for $i \ne j$. Since $H_{ij} = U_{ij} \cdot rH_{ij}$ or $H_{ij} = U_{ij} \cdot \text{Rot\_V}_{ij} \cdot rH_{ij}$, the following may be obtained: $H_{ij} \cdot Q_j = 0$ for $i \ne j$. All received signal terms in $rx_j$ except $H_{ij} \cdot Q_i \cdot W_i$ are 0. Thus, the received signal at the $i^{th}$ STA may become $rx_i = H_{ij} \cdot Q_i \cdot W_i \cdot x_i$.

Orthogonality between sts within the $i^{th}$ user in CMAP transmission may also be achieved, as explained below. For uncompressed $V_{ij}$ feedback $H_{ij}=U_{ij} \cdot rH_{ij}$, $rx_i=H_{ij} \cdot Q_i \cdot W_i \cdot x_i = U_{ij} \cdot (rH_{ij} \cdot Q_i \cdot W_i) \cdot x_i = U_{ij} \cdot U_{pi} \cdot S_{pi} \cdot x_i$, where $U_{ij} \cdot U_{pi}$ is a $N_{stsi} \times N_{stsi}$ unitary matrix and $(U_{ij} \cdot U_{pi})^{t} \cdot rx_i = S_{pi} \cdot x_i$. For compressed $V_{cij}$ feedback $rH_{ij}=Rot\_V_{ij}' \cdot S_{ij} \cdot V_{ij}' \rightarrow H_{ij}=U_{ij} \cdot Rot\_V_{ij} \cdot rH_{ij}$, and $rx_i=H_{ij} \cdot Q_i \cdot W_i \cdot x_i = U_{ij} \cdot Rot\_V_{ij} \cdot (rH_{ij} \cdot Q_i \cdot W_i) \cdot x_i = U_{ij} \cdot Rot\_V_{ij} \cdot U_{pi} \cdot S_{pi} \cdot x_i$, where $U_{ij} \cdot Rot\_V_{ij} \cdot U_{pi}$ is also a $N_{stsi} \times N_{stsi}$ unitary matrix and $(U_{ij} \cdot Rot\_V_{ij} \cdot U_{pi})^{t} \cdot rx_i = S_{pi} \cdot x_i$.

Under the proposed scheme, in Scenario 2, a third method (or Method 3) may be utilized to provide feedback on CSI jointly to support for JMAP transmission. Specifically, at the $i^{th}$ STA, a full dimension joint channel response matrix $H_i$ $[N_{rxi} \times N_{total\_tx}]=[H_{i1}, \ldots, H_{ij}, \ldots, H_{i(Nap)}]$ may be formed, and SVD may be performed on $H_i$, then singular values and corresponding full dimension $V_i$ vectors may be fed back. Similar to Scenario 1, it is believed that Method 3 may support both JMAP and CMAP transmissions.

Under the proposed scheme, Method 3 may support JMAP transmissions with jointly fed-back CSI from sequential sounding of CMAP. With respect to sequential sounding, MAPs (e.g., AP 120(1)~120(M)) may be sounded sequentially to function as CMAP initially. When the $j^{th}$ AP is scheduled for sounding, the $i^{th}$ STA may estimate channel matrix $H_{ij}[N_{rxi} \times N_{txj}]$, $i=1, 2, \ldots, N_{sta}$. The $i^{th}$ STA may store $H_{ij}$, $j=1, 2, \ldots, N_{ap}$. When all APs 120(1)~120(M) finish sounding, the $i^{th}$ STA may form a joint matrix $H_i[N_{rxi} \times N_{total\_tx}]=[H_{i1}, H_{i2}, \ldots, H_{iNap}]$, $i=1, 2, \ldots, N_{sta}$. The sequential sounding may also impose stringent synchronization requirements on the MAPs if planned for JMAP transmission. For simplicity, it may be assumed that synchronization requirements are met during sequential sounding. With respect to joint feedback of CSI, as explained above, the $i^{th}$ STA may perform SVD on joint matrix $H_i=U_i \cdot S_i \cdot V_i'$. The $i^{th}$ STA may provide feedback on singular values in $S_i$ and corresponding full dimension vectors from $V_i$, uncompressed and compressed. For simplicity, it may be assumed that all singular values and full dimension vectors from $V_i$ are available at all APs 120(1)~120(M). Furthermore, in Method 3, precoding as JMAP, precoding as CMAP and precoding as single AP may be the same as that described above for Method 1.

In view of the above, various highlights of the proposed Method 1, Method 2 and Method 3 for support of MAPs for both JMAP and CMAP transmissions are summarized in FIG. 7. FIG. 7 shows a table 700 of summary of highlights in accordance with the present disclosure.

Illustrative Implementations

Figure 8:
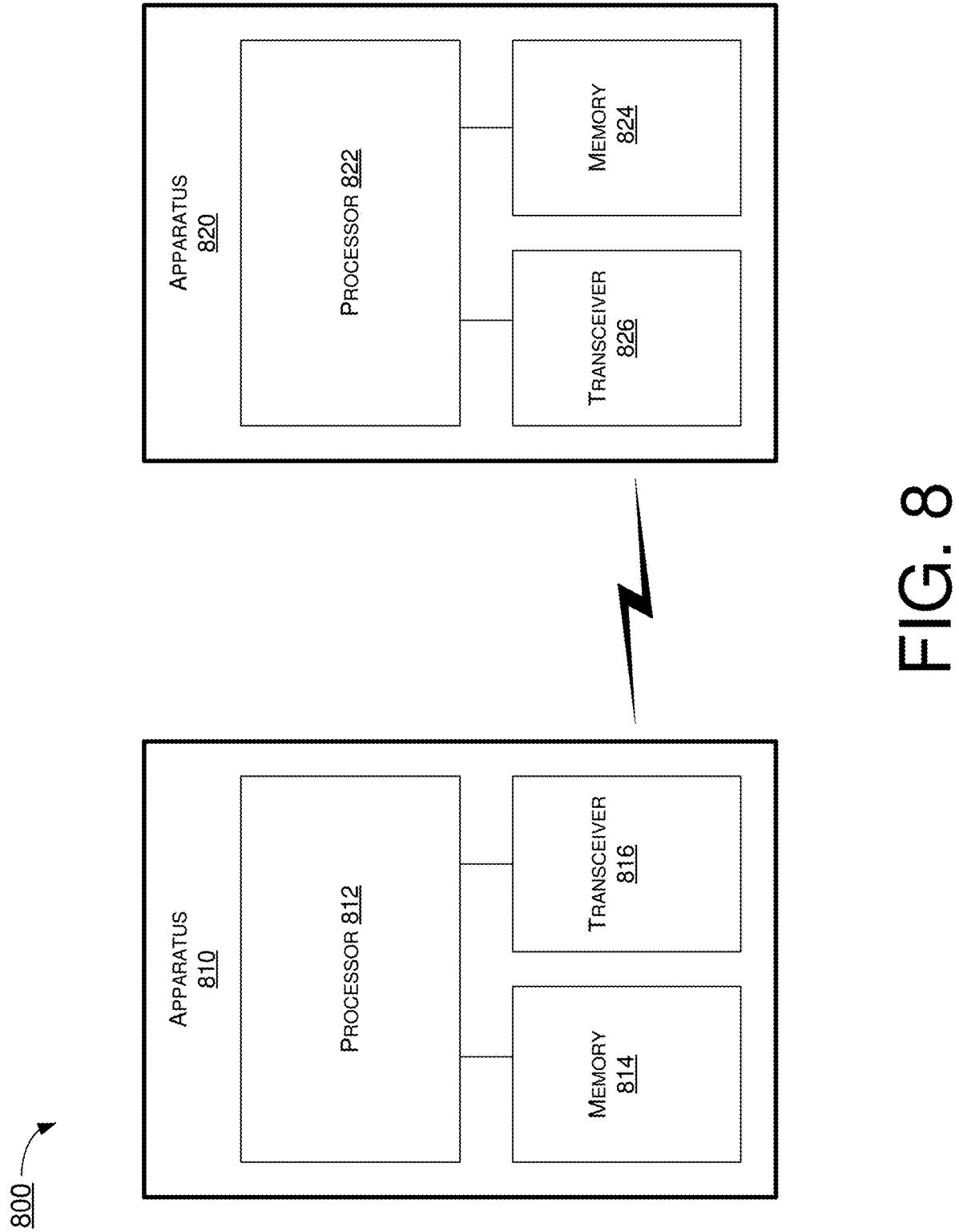
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to efficient EHT sounding feedback for support of both JMAP and CMAP transmissions, including the various schemes described above with respect to various proposed designs, concepts, schemes, systems and methods described above as well as processes described below. For instance, apparatus 810 may be implemented in one of STAs 110(1)~110(N) and apparatus 820 may be implemented in one of APs 120(1) ~120(M), or vice versa.

Each of apparatus 810 and apparatus 820 may be part of an electronic apparatus, which may be a STA or an AP, such as a portable or mobile apparatus, a wearable apparatus, a wireless communication apparatus or a computing apparatus. When implemented in a STA, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a STA or an AP. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to efficient EHT sounding feedback for support of both JMAP and CMAP transmissions in accordance with various implementations of the present disclosure.

In some implementations, apparatus 810 may also include a transceiver 816 coupled to processor 812. Transceiver 816 may include a transmitter capable of wirelessly transmitting and a receiver capable of wirelessly receiving data. In some implementations, apparatus 820 may also include a transceiver 826 coupled to processor 822. Transceiver 826 may include a transmitter capable of wirelessly transmitting and a receiver capable of wirelessly receiving data. It is noteworthy that, although transceiver 816 and transceiver 826 are illustrated as being external to and separate from processor 812 and processor 822, respectively, in some implementations, transceiver 816 may be an integral part of processor 812 as a system on chip (SoC) and/or transceiver 826 may be an integral part of processor 822 as an SoC.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (FeRAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as one of STAs 110(1)~110(N), and apparatus 820, as one of APs 120(1)~120(M), is provided below. It is noteworthy that, although a detailed description of capabilities, functionalities and/or technical features of apparatus 810 is provided below, the same may be applied to apparatus 820 although a detailed description thereof is not provided solely in the interest of brevity. It is also noteworthy that, although the example implementations described below are provided in the context of WLAN, the same may be implemented in other types of networks.

Under a proposed scheme pertaining to efficient EHT sounding feedback for support of both JMAP and CMAP transmissions in accordance with the present disclosure, with apparatus 810 implemented in or as one of STAs 110(1)~110(N) and apparatus 820 implemented in or as one of APs 120(1)~120(M) of a wireless network such as a WLAN in network environment 100 in accordance with one or more of IEEE 802.11 standards, apparatus 820 may participate in joint soundings together with one or more other APs in a JMAP configuration to receive joint feedbacks from a plurality of STAs (e.g., STAs 110(1)~110(N) including apparatus 810 as one of the STAs) responding to the joint soundings. Additionally, apparatus 820 may perform transmissions in a CMAP configuration with the one or more other APs or in a single-AP configuration with no other AP based on the joint feedbacks received while in the JMAP configuration.

In some implementations, in performing transmissions in the CMAP configuration or in the single-AP configuration, processor 822 may reconfigure apparatus 820 to perform the transmissions in the CMAP configuration or in the single-AP configuration using the joint feedbacks received from the plurality of STAs while in the JMAP configuration with no extra information.

In some implementations, the joint feedbacks received from the plurality of STAs may include joint CSI from the plurality of STAs.

In some implementations, before performing the transmissions in the CMAP configuration or in the single-AP configuration, processor 822 may perform certain operations. For instance, processor 822 may reconfigure a respective channel matrix for each of the plurality of STAs based on singular values and corresponding vectors in the joint feedbacks. In such cases, a dimension of the reconstructed channel matrix may be a number of rows corresponding to a number of receivers at a corresponding STA of the plurality of STAs times a number of columns corresponding to a number of total transmitters at the AP and the one or more other APs. Moreover, processor 822 may form a projected channel matrix from the reconstructed channel matrix by extracting a subset of columns of the reconstructed channel matrix corresponding to the AP. In such cases, a number of the columns extracted may correspond to a transmitter index of the AP.

In some implementations, in forming the projected channel matrix, processor 822 may form the projected channel matrix by applying a unitary matrix to the reconstructed channel matrix in an event that the joint feedbacks are uncompressed. Alternatively, in forming the projected channel matrix, processor 822 may form the projected channel matrix by applying a unitary matrix and a rotation vector to the reconstructed channel matrix in an event that the joint feedbacks are compressed.

Under another proposed scheme pertaining to efficient EHT sounding feedback for support of both JMAP and CMAP transmissions in accordance with the present disclosure, with apparatus 810 implemented in or as one of STAs 110(1)~110(N) and apparatus 820 implemented in or as one of APs 120(1)~120(M) of a wireless network such as a WLAN in network environment 100 in accordance with one or more of IEEE 802.11 standards, apparatus 820 may participate in sequential or joint soundings together with one or more other APs in a CMAP configuration to receive feedbacks from a plurality of STAs (e.g., STAs 110(1)~110 (N) including apparatus 810 as one of the STAs) responding to the sequential or joint soundings. Moreover, apparatus 820 may perform transmissions in a JMAP configuration with the one or more other APs or in a single-AP configuration with no other AP based at least in part on the feedbacks received while in the CMAP configuration.

In some implementations, in participating, apparatus 820 may participate in sequential soundings. Moreover, in performing transmissions in the JMAP configuration or in the single-AP configuration, processor 822 may reconfigure apparatus 820 to perform the transmissions in the JMAP configuration or in the single-AP configuration using joint feedbacks received from the plurality of STAs while in the CMAP configuration with no extra information.

In some implementations, in performing transmissions in the JMAP configuration, processor 822 may reconfigure apparatus 820 to perform the transmissions in the JMAP configuration using sequential feedbacks with extra information received from the plurality of STAs while in the CMAP configuration.

In some implementations, each of the sequential feedbacks received from the plurality of STAs may include CSI. Moreover, the extra information may include a unitary matrix from each of the plurality of STAs in an event that the sequential feedbacks are uncompressed.

In some implementations, each of the sequential feedbacks received from the plurality of STAs may include CSI. Feedback information may include singular values and corresponding compressed vectors from each of the plurality of STAs. Moreover, the extra information may include a unitary matrix and a phasor vector corresponding to a matrix V compression in an event that the sequential feedbacks are compressed. In some implementations, the extra information may further include multiple phase rotation vectors a number of which being equivalent to a total number of APs in the CMAP configuration. Alternatively, the extra information may further include a phase rotation vector corresponding to one of a plurality of APs comprising the AP and the one or more other APs.

In some implementations, before performing the transmissions in the JMAP configuration or in the single-AP configuration, processor 822 may reconstruct a respective channel matrix for each of the plurality of STAs based on all CSI feedback information including extra information.

In some implementation, in reconstructing the respective channel matrix, processor 822 may reconstruct the respective channel matrix using a unitary matrix, singular values and corresponding vectors in a V matrix from each of the plurality of STAs in an event that the sequential feedbacks are uncompressed.

In some implementation, in reconstructing the respective channel matrix, processor 822 may reconstruct the respective channel matrix using a unitary matrix, singular values, corresponding compressed vectors and multiple phase rotation vectors from each of the plurality of STAs in an event that the sequential feedbacks are compressed. In such cases, a number of the phase rotation vectors may be equivalent to a total number of APs in the CMAP configuration.

In some implementation, in reconstructing the respective channel matrix, processor 822 may reconstruct the respective channel matrix using a unitary matrix, singular values, corresponding compressed vectors and a phase rotation vectors from each of the plurality of STAs in an event that the sequential feedbacks are compressed. In such cases, the phase rotation vector may correspond to one of a plurality of APs comprising the AP and the one or more other APs.

In some implementation, processor 822 may reconstruct a respective JMAP channel matrix for each of the plurality of STAs based on channel matrixes reconstructed by a plurality of APs comprising the AP and the one or more other APs for each of the plurality of STAs.

Under another proposed scheme pertaining to efficient EHT sounding feedback for support of both JMAP and CMAP transmissions in accordance with the present disclosure, with apparatus 810 implemented in or as one of STAs 110(1)~110(N) and apparatus 820 implemented in or as one of APs 120(1)~120(M) of a wireless network such as a WLAN in network environment 100 in accordance with one or more of IEEE 802.11 standards, apparatus 820 may participate in joint soundings together with a first set of APs in a JMAP configuration to receive joint feedbacks from a plurality of STAs (e.g., STAs 110(1)~110(N) including apparatus 810 as one of the STAs) responding to the joint soundings. Furthermore, apparatus 820 may perform transmissions in a reduced JMAP configuration with a second set of APs based on the joint feedbacks received while in the JMAP configuration with no additional feedback information.

In some implementations, the first set of APs may have more APs than the second set of APs.

In some implementations, the joint feedbacks received from the plurality of STAs may include joint CSI from the plurality of STAs.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to efficient EHT sounding feedback for support of both JMAP and CMAP transmissions in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 implemented in or as one of STAs 110(1)~110(N) and apparatus 820 implemented in or as one of APs 120(1)~120 (M) of a wireless network such as a WLAN in network environment 100 in accordance with one or more of IEEE 802.11 standards. Process 900 may begin at block 910.

At 910, process 900 may involve processor 822 of apparatus 820 participating in joint soundings together with one or more other APs in a JMAP configuration to receive joint feedbacks from a plurality of STAs (e.g., STAs 110(1)~110 (N) including apparatus 810 as one of the STAs) responding to the joint soundings. Process 900 may proceed from 910 to 920.

At 920, process 900 may involve processor 822 performing transmissions in a CMAP configuration with the one or more other APs or in a single-AP configuration with no other AP based on the joint feedbacks received while in the JMAP configuration.

In some implementations, in performing transmissions in the CMAP configuration or in the single-AP configuration, process 900 may involve processor 822 reconfiguring apparatus 820 to perform the transmissions in the CMAP configuration or in the single-AP configuration using the joint feedbacks received from the plurality of STAs while in the JMAP configuration with no extra information.

In some implementations, the joint feedbacks received from the plurality of STAs may include joint CSI from the plurality of STAs.

In some implementations, before performing the transmissions in the CMAP configuration or in the single-AP configuration, process 900 may involve processor 822 performing certain operations. For instance, process 900 may involve processor 822 reconstructing a respective channel matrix for each of the plurality of STAs based on singular values and corresponding vectors in the joint feedbacks. In such cases, a dimension of the reconstructed channel matrix may be a number of rows corresponding to a number of receivers at a corresponding STA of the plurality of STAs times a number of columns corresponding to a number of total transmitters at the AP and the one or more other APs. Moreover, process 900 may involve processor 822 forming a projected channel matrix from the reconstructed channel matrix by extracting a subset of columns of the reconstructed channel matrix corresponding to the AP. In such cases, a number of the columns extracted may correspond to a transmitter index of the AP.

In some implementations, in forming the projected channel matrix, process 900 may involve processor 822 forming the projected channel matrix by applying a unitary matrix to the reconstructed channel matrix in an event that the joint feedbacks are uncompressed. Alternatively, in forming the projected channel matrix, process 900 may involve processor 822 forming the projected channel matrix by applying a unitary matrix and a rotation vector to the reconstructed channel matrix in an event that the joint feedbacks are compressed.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to efficient EHT sounding feedback for support of both JMAP and CMAP transmissions in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 810 and apparatus 820 as well as any variations thereof. Solely for illustrative purposes and without limiting the scope, process 1000 is described below in the context of apparatus 810 implemented in or as one of STAs 110(1)~110(N) and apparatus 820 implemented in or as one of APs 120(1)~120(M) of a wireless network such as a WLAN in network environment 100 in accordance with one or more of IEEE 802.11 standards. Process 1000 may begin at block 1010.

At 1010, process 1000 may involve processor 822 of apparatus 820 participating in sequential or joint soundings together with one or more other APs in a CMAP configuration to receive feedbacks from a plurality of STAs (e.g., STAs 110(1)~110(N) including apparatus 810 as one of the STAs) responding to the sequential or joint soundings. Process 1000 may proceed from 1010 to 1020.

At 1020, process 1000 may involve processor 822 performing transmissions in a JMAP configuration with the one or more other APs or in a single-AP configuration with no other AP based at least in part on the feedbacks received while in the CMAP configuration.

In some implementations, in participating, process 1000 may involve processor 822 participating in sequential soundings. Moreover, in performing transmissions in the JMAP configuration or in the single-AP configuration, process 1000 may involve processor 822 reconfiguring apparatus 820 to perform the transmissions in the JMAP configuration or in the single-AP configuration using joint feedbacks received from the plurality of STAs while in the CMAP configuration with no extra information.

In some implementations, in performing transmissions in the JMAP configuration, process 1000 may involve processor 822 reconfiguring apparatus 820 to perform the transmissions in the JMAP configuration using sequential feedbacks with extra information received from the plurality of STAs while in the CMAP configuration.

In some implementations, each of the sequential feedbacks received from the plurality of STAs may include CSI. Moreover, the extra information may include a unitary matrix from each of the plurality of STAs in an event that the sequential feedbacks are uncompressed.

In some implementations, each of the sequential feedbacks received from the plurality of STAs may include CSI. Feedback information may include singular values and corresponding compressed vectors from each of the plurality of STAs. Moreover, the extra information may include a unitary matrix and a phasor vector corresponding to a matrix V compression in an event that the sequential feedbacks are compressed. In some implementations, the extra information may further include multiple phase rotation vectors a number of which being equivalent to a total number of APs in the CMAP configuration. Alternatively, the extra information may further include a phase rotation vector corresponding to one of a plurality of APs comprising the AP and the one or more other APs.

In some implementations, before performing the transmissions in the JMAP configuration or in the single-AP configuration, process 1000 may involve processor 822 reconstructing a respective channel matrix for each of the plurality of STAs based on all CSI feedback information including extra information.

In some implementation, in reconstructing the respective channel matrix, process 1000 may involve processor 822 reconstructing the respective channel matrix using a unitary matrix, singular values and corresponding vectors in a V matrix from each of the plurality of STAs in an event that the sequential feedbacks are uncompressed.

In some implementation, in reconstructing the respective channel matrix, process 1000 may involve processor 822 reconstructing the respective channel matrix using a unitary matrix, singular values, corresponding compressed vectors and multiple phase rotation vectors from each of the plurality of STAs in an event that the sequential feedbacks are compressed. In such cases, a number of the phase rotation vectors may be equivalent to a total number of APs in the CMAP configuration.

In some implementation, in reconstructing the respective channel matrix, process 1000 may involve processor 822 reconstructing the respective channel matrix using a unitary matrix, singular values, corresponding compressed vectors and a phase rotation vectors from each of the plurality of STAs in an event that the sequential feedbacks are compressed. In such cases, the phase rotation vector may correspond to one of a plurality of APs comprising the AP and the one or more other APs.

In some implementation, process 1000 may further involve processor 822 reconstructing a respective JMAP channel matrix for each of the plurality of STAs based on channel matrixes reconstructed by a plurality of APs comprising the AP and the one or more other APs for each of the plurality of STAs.

Figure 11:
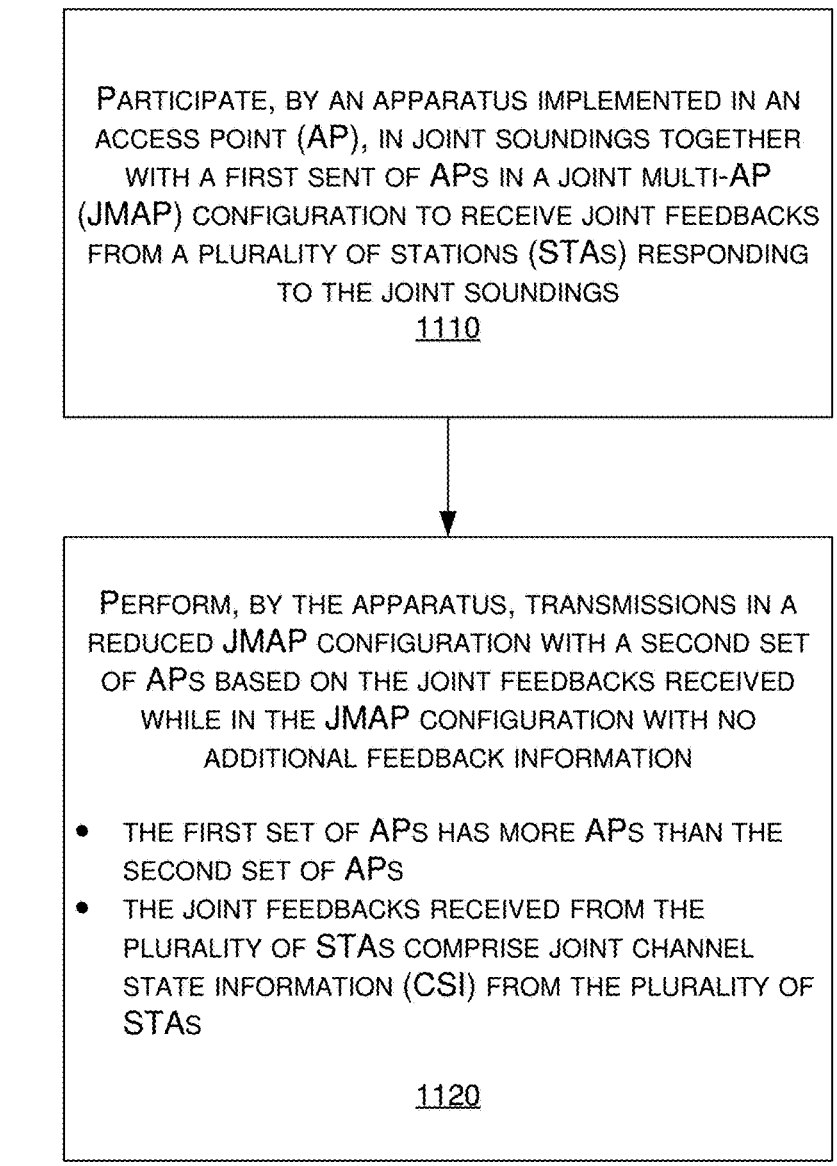
FIG. 11 is a flowchart of an example process in accordance with an implementation of the present disclosure.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to efficient EHT sounding feedback for support of both JMAP and CMAP transmissions in accordance with the present disclosure. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 810 and apparatus 820 as well as any variations thereof. Solely for illustrative purposes and without limiting the scope, process 1100 is described below in the context of apparatus 810 implemented in or as one of STAs 110(1)~110(N) and apparatus 820 implemented in or as one of APs 120(1)~120(M) of a wireless network such as a WLAN in network environment 100 in accordance with one or more of IEEE 802.11 standards. Process 1100 may begin at block 1110.

At 1110, process 1100 may involve processor 822 of apparatus 820 participating in joint soundings together with a first set of APs in a JMAP configuration to receive joint feedbacks from a plurality of STAs (e.g., STAs 110(1)~110(N) including apparatus 810 as one of the STAs) responding to the joint soundings. Process 1100 may proceed from 1110 to 1120.

At 1120, process 1100 may involve processor 812 performing transmissions in a reduced JMAP configuration with a second set of APs based on the joint feedbacks received while in the JMAP configuration with no additional feedback information.

In some implementations, the first set of APs may have more APs than the second set of APs.

In some implementations, the joint feedbacks received from the plurality of STAs may include joint CSI from the plurality of STAs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implemented in an access point (AP), comprising:
    participating in joint soundings together with one or more other APs in a joint multi-AP (JMAP) configuration to receive joint feedbacks from a plurality of stations (STAs) responding to the joint soundings; and
    performing transmissions in a coordinated multi-AP (CMAP) configuration with the one or more other APs or in a single-AP configuration with no other AP based on the joint feedbacks received while in the JMAP configuration,
    wherein the performing of transmissions in the CMAP configuration or in the single-AP configuration comprises reconfiguring to perform the transmissions in the CMAP configuration or in the single-AP configuration using the joint feedbacks received from the plurality of STAs while in the JMAP configuration with no extra information.

2. The method of claim 1, wherein the joint feedbacks received from the plurality of STAs comprise joint channel state information (CSI) from the plurality of STAs.

3. The method of claim 1, before performing the transmissions in the CMAP configuration or in the single-AP configuration, further comprising:
reconstructing a respective channel matrix for each of the plurality of STAs based on singular values and corresponding vectors in the joint feedbacks,
wherein a dimension of the reconstructed channel matrix is a number of rows corresponding to a number of receivers at a corresponding STA of the plurality of STAs times a number of columns corresponding to a number of total transmitters at the AP and the one or more other APs.

4. The method of claim 3, further comprising:
forming a projected channel matrix from the reconstructed channel matrix by extracting a subset of columns of the reconstructed channel matrix corresponding to the AP,
wherein a number of the columns extracted corresponds to a transmitter index of the AP.

5. The method of claim 4, wherein the forming of the projected channel matrix comprises forming the projected channel matrix by applying a unitary matrix to the reconstructed channel matrix in an event that the joint feedbacks are uncompressed.

6. The method of claim 4, wherein the forming of the projected channel matrix comprises forming the projected channel matrix by applying a unitary matrix and a rotation vector to the reconstructed channel matrix in an event that the joint feedbacks are compressed.

7. A method implemented in an access point (AP), comprising:
participating in sequential or joint soundings together with one or more other APs in a coordinated multi-AP (CMAP) configuration to receive feedbacks from a plurality of stations (STAs) responding to the sequential or joint soundings; and
performing transmissions in a joint multi-AP (JMAP) configuration with the one or more other APs or in a single-AP configuration with no other AP based at least in part on the feedbacks received while in the CMAP configuration,
wherein the participating comprises participating in sequential soundings, and
wherein the performing of transmissions in the JMAP configuration or in the single-AP configuration comprises reconfiguring to perform the transmissions in the JMAP configuration or in the single-AP configuration using joint feedbacks received from the plurality of STAs while in the CMAP configuration with no extra information.

8. The method of claim 7, wherein the performing of transmissions in the JMAP configuration comprises reconfiguring to perform the transmissions in the JMAP configuration using sequential feedbacks with extra information received from the plurality of STAs while in the CMAP configuration.

9. The method of claim 8, wherein each of the sequential feedbacks received from the plurality of STAs comprises channel state information (CSI), and wherein the extra information comprises a unitary matrix from each of the plurality of STAs in an event that the sequential feedbacks are uncompressed.

10. The method of claim 8, wherein each of the sequential feedbacks received from the plurality of STAs comprises channel state information (CSI), and wherein the extra information comprises a unitary matrix and a phasor vector corresponding to a matrix V compression.

11. The method of claim 10, wherein the extra information further comprises multiple phase rotation vectors a number of which being equivalent to a total number of APs in the CMAP configuration.

12. The method of claim 10, wherein the extra information further comprises a phase rotation vector corresponding to one of a plurality of APs comprising the AP and the one or more other APs.

13. The method of claim 8, before performing the transmissions in the JMAP configuration or in the single-AP configuration, further comprising:
reconstructing a respective channel matrix for each of the plurality of STAs based on all channel state information (CSI) feedback information including extra information.

14. The method of claim 13, wherein the reconstructing of the respective channel matrix comprises reconstructing the respective channel matrix using a unitary matrix, singular values and corresponding vectors in a V matrix from each of the plurality of STAs in an event that the sequential feedbacks are uncompressed.

15. The method of claim 13, wherein the reconstructing of the respective channel matrix comprises reconstructing the respective channel matrix using a unitary matrix, singular values, corresponding compressed vectors and multiple phase rotation vectors from each of the plurality of STAs in an event that the sequential feedbacks are compressed, and wherein a number of the phase rotation vectors is equivalent to a total number of APs in the CMAP configuration.

16. The method of claim 13, wherein the reconstructing of the respective channel matrix comprises reconstructing the respective channel matrix using a unitary matrix, singular values, corresponding compressed vectors and a phase rotation vectors from each of the plurality of STAs in an event that the sequential feedbacks are compressed, and wherein the phase rotation vector corresponds to one of a plurality of APs comprising the AP and the one or more other APs.

17. The method of claim 13, further comprising:
reconstructing, by the processor, a respective JMAP channel matrix for each of the plurality of STAs based on channel matrixes reconstructed by a plurality of APs comprising the AP and the one or more other APs for each of the plurality of STAs.

18. A method, comprising:
participating, by an apparatus implemented in an access point (AP), in joint soundings together with a first set of APs in a joint multi-AP (JMAP) configuration to receive joint feedbacks from a plurality of stations (STAs) responding to the joint soundings; and
performing, by the apparatus, transmissions in a reduced JMAP configuration with a second set of APs based on the joint feedbacks received while in the JMAP configuration with no additional feedback information,
wherein the first set of APs has more APs than the second set of APs, and
wherein the joint feedbacks received from the plurality of STAs comprise joint channel state information (CSI) from the plurality of STAs.

* * * * *